United States Patent
Buuck et al.

(10) Patent No.: US 10,460,525 B1
(45) Date of Patent: Oct. 29, 2019

(54) CLOTHING ITEM MEASUREMENT AND VISUALIZATION SYSTEM

(71) Applicant: Amazon Technologies, Inc., Seattle, WA (US)

(72) Inventors: David Charles Buuck, Prunedale, CA (US); Elizabeth Helminski, Newark, CA (US); David William Devries, San Jose, CA (US); Steve Gil Gonzalez, Los Gatos, CA (US); Ali Shahrokni, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 287 days.

(21) Appl. No.: 15/474,968

(22) Filed: Mar. 30, 2017

(51) Int. Cl.
| | |
|---|---|
| G06T 17/00 | (2006.01) |
| A41H 5/02 | (2006.01) |
| G06T 19/20 | (2011.01) |
| G01B 11/24 | (2006.01) |
| G01F 22/00 | (2006.01) |
| G06Q 30/06 | (2012.01) |

(52) U.S. Cl.
CPC ............ G06T 19/20 (2013.01); A41H 5/02 (2013.01); G01B 11/24 (2013.01); G01F 22/00 (2013.01); G06Q 30/0631 (2013.01); G06Q 30/0643 (2013.01); G06T 17/00 (2013.01); G06T 2200/08 (2013.01); G06T 2210/16 (2013.01)

(58) Field of Classification Search
CPC ...... G06T 17/00; G06Q 30/0643; A41H 5/02; G01B 11/24; G01B 11/02; G01F 22/00

USPC .............................. 33/1 V, 2 R, 512; 223/67
See application file for complete search history.

(56) References Cited

U.S. PATENT DOCUMENTS

| | | | | |
|---|---|---|---|---|
| 3,405,852 A * | 10/1968 | Fox | ........................ | A41H 5/02 223/67 |
| 4,417,401 A * | 11/1983 | Aisaka | ................... | G01B 5/207 33/2 R |
| 6,415,199 B1 * | 7/2002 | Liebermann | ............. | A41H 1/02 33/512 |
| 6,813,838 B2 * | 11/2004 | McCormick | ........... | A41H 3/007 33/17 R |
| 10,127,717 B2 * | 11/2018 | Tepmongkol | ............. | G06T 5/20 |
| 2005/0154487 A1 * | 7/2005 | Wang | ........................ | A41H 1/00 700/132 |
| 2009/0222127 A1 * | 9/2009 | Lind | ...................... | A41H 3/007 700/132 |
| 2013/0238285 A1 * | 9/2013 | Volchek | ................... | A41H 5/01 702/188 |

(Continued)

Primary Examiner — Christopher W Fulton
(74) Attorney, Agent, or Firm — Quarles and Brady LLP

(57) ABSTRACT

A system includes a fit test fixture. A first air bladder is connected to the support structure, and a second air bladder is connected to the support structure. The system includes a scanner configured to generate a three-dimensional model of a clothing item positioned over at least a portion of the fit test fixture, and a controller. The controller is configured to cause an air compressor to inflate the first air bladder and the second air bladder, and store the three-dimensional model of the clothing item in a database. The three-dimensional model depicts the clothing item at least partially inhabited by the first air bladder and the second air bladder. A processor is configured to generate a rendering depicting the three-dimensional model of the clothing item on a three-dimensional model of the consumer.

20 Claims, 13 Drawing Sheets

(56) References Cited

U.S. PATENT DOCUMENTS

| | | | |
|---|---|---|---|
| 2014/0168217 A1* | 6/2014 | Kim | G06T 13/40 345/420 |
| 2014/0358738 A1* | 12/2014 | Ohnemus | G06Q 30/0643 705/27.2 |
| 2016/0292765 A1* | 10/2016 | Jin | G06Q 30/0629 |
| 2017/0076011 A1* | 3/2017 | Gannon | G06Q 30/0633 |
| 2019/0137258 A1* | 5/2019 | Belknap | G01B 11/02 |

* cited by examiner

| Flag | Measurement Location |
|---|---|
| W | Waist |
| I | Inseam |
| O | Outseam |
| F | Front Rise |
| D | Dip |
| H | Hips (Seat) |
| B | Back Rise |

| Flag | Measurement Location |
|---|---|
| Z | Zipper |
| U | Upper Thigh |
| T | Thigh |
| K | Knee |
| C | Calf |
| A | Ankle |

| Flag | Measurement Location |
|---|---|
| W | Waist |
| H | Hips |
| U | Upper Thigh |
| T | Thigh |
| K | Knee |
| C | Calf |
| B | Ankle |

CLOTHING ITEM MEASUREMENT AND VISUALIZATION SYSTEM

BACKGROUND

Many types of products may be ordered online for delivery directly to a consumer, including clothing and other items that are purchased by size and fit. Online selection of clothing for purchase may be difficult however, because a consumer may not get a clear idea of how a particular clothing item will fit the consumer's body or how the clothing item will flow over the body when worn by the consumer, simply by reading a description of the item or by looking at a supplied photograph. Even if the item is shown in the photograph as being worn by a model, the model will typically be of a standard body size and shape that may not closely match the size and shape of the consumer's body. Because of the difficulty in selecting clothing items online, online merchants of clothing may see reduced sales of clothing items and may also experience high return-rates for these items, thus increasing costs to both the merchant and the consumers.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1A:
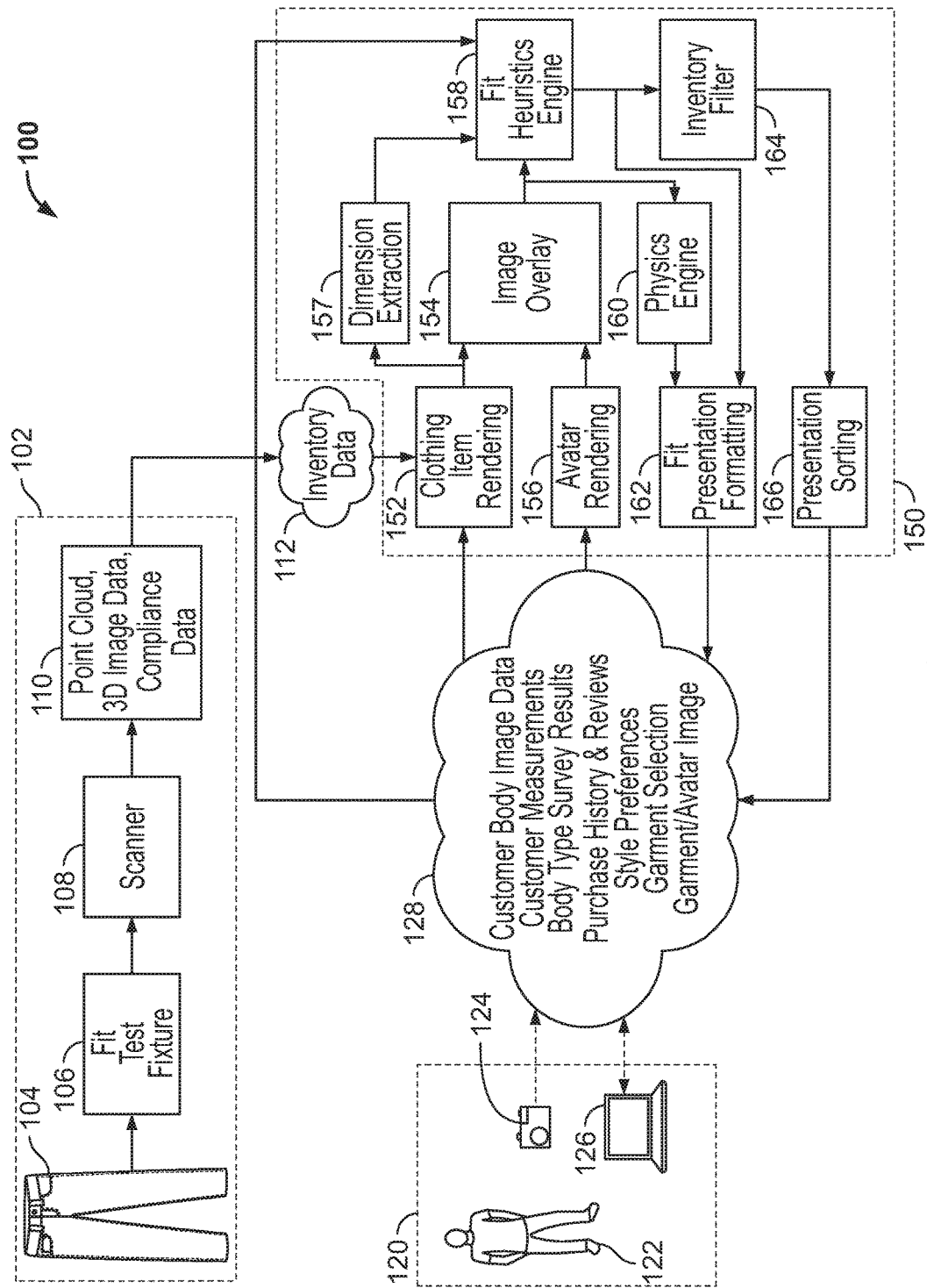
FIG. 1A is a system diagram depicting an illustrative operating environment in which embodiments of the present system may be implemented.

The following detailed description is directed to technologies for measuring dimensions and compliance levels of clothing items. With the data captured, visualizations of the fit of particular clothing items can be provided to an online consumer. Utilizing the embodiments described herein, a consumer of clothing items may be provided with a three-dimensional ("3-D") visualization of how a selected clothing item will look when worn by the consumer. The consumer may further interact with the 3-D visualization of the clothing item, viewing the visualization from different perspectives, in order to get a clearer idea of the fit of the clothing item before purchasing the clothing item from the merchant. The 3-D visualization may further provide the consumer with a heat map or other visual representation indicating regions of the clothing item that are likely to feel tight or loose.

Because the 3-D visualizations are generated using a comprehensive set of characteristic data (e.g., dimensions and compliance information) over a number of regions of the clothing item, the visualizations may be capable of illustrating a more realistic or photo-realistic depiction of the clothing item as it would actually appear if worn by the consumer. This allows the consumer to select the item, not only based upon a small number of dimensions of the clothing item being compatible with those of the consumer (in conventional approaches a consumer may only compare waist and length of a pair of jeans, for example) but upon the actual appearance of the clothing item. In turn, this can enable the consumer to shop for, identify, and select clothing items that will flatter the consumer's body, rather than merely fit the consumer's body.

To provide accurate 3-D visualization of how a selected item will look and feel (and ultimately, flatter the consumer) when worn by a consumer, the present system provides a fit test fixture that is configured to operate in conjunction with an imaging or scanner device to provide accurate measurements of both the dimensions and compliance of a particular clothing item. In this disclosure, compliance refers to the capability of a clothing item to stretch in particular regions or along a particular dimension of the clothing item. In this disclosure, the compliance of a particular region of a clothing item may refer to a measurement of force versus displacement of the fabric within that region of the clothing item. The combination of the dimensions and compliance of a particular clothing item can all have an effect on the way a particular clothing item looks and feels when worn by a consumer.

The fit test fixture generally includes a mechanical or pneumatic device over which the clothing item being tested can be placed. If the clothing item is a pair of trousers or jeans, for example, the fit test fixture may include extensions that are positioned within the legs of the trousers. With the clothing item installed, segments of the fit test fixture are expanded, e.g., through the application of mechanical force, air pressure, or the like, until the segments of the fit test fixture have reached a volume that is, to some degree, constrained by the clothing item. By monitoring the expansion of the clothing item as the fit test fixture expands, such as using a 3-D scanning device, it is possible to determine various geometrical dimensions and compliance attributes of the clothing item.

In addition to capturing dimensions and compliance data of the clothing item, with the fit test fixture fully expanded within the clothing item, images and 3-D models of the clothing item can be captured. Because the fit test fixture is expanded within the clothing item at the time the images and 3-D model are captured, the images and 3-D model will be representative of how the clothing item will appear when worn by an individual.

In embodiments, a fit test fixture includes a number of air bladders that are configured to be positioned within the clothing item being tested. Such a fit test fixture may include, for example, a single air bladder, or as many as twelve or more air bladders, where each individual air bladder may operate as a separately-inflatable region of the fit test fixture. To use the fit test fixture, the fit test fixture with uninflated air bladders is first positioned within the clothing item. The air bladders of the fit test fixture are then inflated or expanded so that the fit test fixture fully inhabits the clothing item being tested. As described below, a fit test fixture with multiple independent air bladders can be used to capture data of a clothing item as that clothing item would appear on a consumer having various different body types and shapes. By inflating the different air bladders to different degrees, for example, a consumer having a particular body shape (e.g., hour-glass, rectangular shape, pear shape, inverted-triangle shape, and the like) can be approximated. The resulting data, once captured, can be used to provide a more accurate visualization of the clothing item based upon the consumer's own body type. This will, in turn, enable the visualization to more accurately depict not only the fit of the clothing item for the consumer, but how the clothing item will appear and, ultimately, flatter the consumer's body.

With the clothing item fully inhabited by the fit test fixture, images and measurements can be taken of the clothing item. In an embodiment, the fully inhabited clothing item is positioned upon a turntable enabling a 3-D scanner or other imaging device to capture a 3-D model of the clothing item. That 3-D model can then be accessed and used to identify particular dimension measurements of the clothing item. Additionally, if the fit test fixture is inflated to fully inhabit the clothing item while the clothing item is being imaged by the 3-D scanner, the changes to the 3-D model over time (i.e., as the fit test fixture is inflated) or at different inflation levels of the fit test fixture may be used to determine a compliance of the clothing item—that is, the ability of the clothing item to stretch in various regions or along various dimensions of the clothing item.

In addition to a 3-D scanner capturing a 3-D model of the clothing item being tested, in an embodiment, the fit test fixture may also monitor the internal air pressure of the one or more air bladders of the fit test fixture. Given a continuous flow of air into an air bladder of the fit test fixtures, that rate of change of air pressure within the air bladder could be used to derive a level of compliance of the clothing item in a region of the clothing item that is in contact with the air bladder.

In addition to capturing and generating 3-D models of the inhabited clothing item, the scanner may also be used to capture optical images of the clothing. The optical images may be used to provide surface detail in a 3-D rendering of the clothing item for the consumer.

In order to appropriately depict the clothing item as it may look and feel for a particular consumer, the present system may also utilize a 3-D model of the consumer that wishes to shop for a clothing item. The 3-D model of the consumer may be captured, for example, by a 3-D scanner that directly images the consumer's body. Once scanned, the consumer's 3-D model (also referred to herein as an avatar) may be stored in a consumer profile accessible to the present system. When the consumer wishes to shop for a particular clothing item, the consumer's 3-D model can be retrieved from the consumer's profile and a 3-D model of the clothing item can be rendered over the consumer's 3-D model to provide feedback to the consumer regarding how a particular clothing item with look and feel for the consumer, as described below.

In other embodiments, the consumer's 3-D model may not be generated entirely by 3-D scanning and may instead be at least partially or entirely generated by feedback from the consumer regarding the shape of the consumer's body. For example, the consumer may complete a questionnaire that calls for the consumer to directly enter dimension measurements of the consumer's body or provide information about the overall shape of the consumer's body (e.g., whether the consumer has an hour-glass, rectangular shape, pear shape, inverted-triangle shape, and the like).

Alternatively, or in addition to these techniques, attributes of the size and shape of the consumer's body may be derived from the consumer's shopping history. For example, dimension and compliance data associated with clothing items that the consumer has purchased and not returned, or given a relatively high rating—indicating that the consumer likes the fit and feel of the clothing item, may be used to derive information regarding the size and shape of the consumer's body. In such a case, the consumer's body may be presumed to have a size and shape similar to that of other consumer's that have also purchased the same clothing item (or another clothing item having the same fit) and given such a clothing item relatively high ratings.

With 3-D models of both a clothing item and the consumer's body, the 3-D model of the consumer's body may be combined with the 3-D models of various clothing items to provide an illustration of how the clothing item will look on the consumer and feedback to the consumer regarding the fit and feel of a particular clothing item. The system may provide consumers with size recommendations for clothing items they are considering, provide details on how clothing will fit (for example, where the clothing item will be tight or loose), and create a realistic visual representation on a 3-D model avatar of the consumer of how the clothing item will look on the consumer should the consumer try on the actual clothing item.

FIG. 1A and the following description are intended to provide a general description of a suitable computing environment 100 in which the embodiments described herein may be implemented. In particular, FIG. 1A is a system diagram that shows an illustrative operating environment 100 including several software and hardware components for providing visualization of fit and flow of clothing, according to embodiments provided herein. The system implemented within environment 100 may further provide assistance to a consumer in shopping for clothing items, as detailed below.

Environment 100 includes a first data acquisition flow 102 that is arranged to capture 3-D models and dimensional and compliance data of various clothing items in a merchant or other entity's inventory. Accordingly, data acquisition flow 102 is configured to receive a first sample clothing item 104 from the merchant's inventory. Clothing item 104 is then installed upon fit test fixture 106. As described in more detail below, fit test fixture 106 is configured with one or more inflatable or expandable regions or bladders. With sample clothing item 104 installed onto fit test fixture 106, the bladders are inflated or expanded so that fit test fixture 106 fully inhabits sample clothing item 104 in a manner similar to that if sample clothing item 104 were to be worn by an individual.

With sample clothing item 104 inhabited by fit test fixture 106, scanner 108 performs a 3-D scan of sample clothing item 104 with scanner 108 to generate a 3-D model of the inhabited sample clothing item 104. The 3-D model may include photographic data, vector graphics, texture maps, and other modeling components obtained by scanning the inhabited sample clothing item 104. For example, the 3-D model may be obtained through an optical scanning apparatus, described in more detail below and illustrated in FIGS. 4 and 8A that captures multiple photographic images of sample clothing item 104 from one or more cameras at varying angles. The 3-D scanning apparatus may also capture depth information in addition to optical data about the clothing item. 3-D modeling software may then be used to synthesize the 3-D model of the clothing item from the captured photographs.

In another example, scanner 108 may consist of a combination of active and/or passive 3-D scanners or sensors that could be used to obtain the 3-D model directly from fit test fixture 106.

With the 3-D model of sample clothing item 104 captured by scanner 108, the 3-D model is processed to generate a set of characteristics 110 for sample clothing item 104. As illustrated in FIG. 1A, characteristics 110 of sample clothing item 104 may include a point cloud, 3-D image data, as well as dimensional and compliance data for sample clothing item 104. In one embodiment, scanner 108 is configured to capture profile and circumferential data that embodies a particular volumetric space occupied by the inhabited clothing item. The captured data may include, for example, textured 3-D point cloud data that includes texture map data enabling surface details of the clothing item to be rendered over the 3-D point cloud model of the clothing item.

The characteristics of sample clothing item 104 retrieved from the 3-D model are compiled and stored within inventory database 112. Inventory database 112 may include a database server that is accessible by server computers and other components within environment 100.

In this manner, data acquisition flow 102 enables a merchant to use an at least partially automated fit test fixture 106 to capture characteristics of the merchant's inventory of clothing items. The characteristics can include a textured 3-D model of the clothing items, as well as information describing the clothing items' geometries and levels of compliance in particular regions of the clothing items. The clothing item characteristics could be captured for each individual clothing item sold by the merchant, or could be captured for only a subset (e.g., a subset of the most popular sizes and/or styles) of the clothing items sold by the merchant. This data capture step may involve using only a single fit test fixture 106, or multiple fit test fixtures 106 may be utilized where each fit test fixture 106 is configured for a particular range of types, sizes, and/or styles of the clothing items sold by the merchant.

In some embodiments, the data captured by scanner 108 as well as the characteristics 110 (e.g., geometry and compliance) generated from the 3-D model captured by scanner 108 may be supplemented with data from other sources. For examples, additional manual measurements may be made of each sample clothing item 104 before or after the sample clothing item 104 is processed on fit test fixture 106. Example manual measurement may include determining the weight of the clothing item, as well as the thickness of the fabric of the clothing item 104 in different regions, such as, for a pair of trousers, the thickness of the fabric at the waist or ankle of the clothing item. Manual measurements may also be made of the compliance levels of the clothing item 104 in different regions of the clothing item 104. In some cases, third party data sources may also provide attributes of each sample clothing item 104 that may be stored in inventory database 112 in conjunction with characteristics 110.

In addition to capturing characteristics 110 of sample clothing items 104, environment 100 includes a second data acquisition flow 120 configured to capture a 3-D model or avatar of consumer 122.

Consumer 122 may be an individual or entity that desires to select clothing items and other products for purchase from the merchant. In order to provide consumer 122 with information about the fit and feel of clothing items selected by consumer 122 for potential purchase, data acquisition flow 120 is arranged to capture information describing the shape of consumer 122's body. In one embodiment, scanner 124 is configured to image consumer 122's body to generate a 3-D model of consumer 122. Scanner 124, as in the case of scanner 108, may perform a 3-D scan of consumer 122 to generate a 3-D model or avatar of the body of consumer 122. The 3-D model may include photographic data, vector graphic data, texture maps (e.g., which may include surface ornamentation of the 3-D model), and other modeling components. For example, the 3-D model may be obtained through a scanning apparatus that captures multiple photographic images of consumer 122 from multiple cameras at varying angles. 3-D modeling software may then be used to synthesize the 3-D model from the captured photographs. In another example, scanner 124 may consist of a combination of active and/or passive 3-D image and depth scanners that could be used to obtain the 3-D model directly from consumer 122.

Alternatively or in addition to the data describing consumer 122 captured by scanner 124, consumer 122 may provide additional data describing consumer 122 through other means. For example, consumer 122 may use computing device 126 to directly input measurements of consumer 122, as well as body type survey information (e.g., whether consumer 122 has an hour-glass, rectangular shape, pear shape, inverted-triangle shape, and the like) and style preferences. In this example, the style preferences may indicate regions of clothing items that consumer 122 prefers to be tighter or looser, for example. For example, consumer 122 may specify a preference for "skinny" style jeans and/or clothing. Consumer 122 may indicate that consumer 122 prefers clothing to be loose or tight in particular regions. In some embodiments, style preferences could include a description of visual attributes of clothing items preferred by consumer 122. Example visual attributes may include a preference for particular colors or shades of clothing items, or a preference for patterned versus non-patterned clothing items. Style preferences for consumer 122 may also be derived inferentially. For example, by analyzing a past purchase history of consumer 122, and consumer 122's reviews of prior clothing item purchases, it may be possible derive attributes of clothing items that consumer 122 prefers. If consumer 122, for example, consistently purchases and likes clothing items that conventional analysis may indicate would be too tight for consumer 122, consumer 122's preferences could be updated to indicate that consumer 122 prefers tighter clothing items. This preference may indicate a preference for tighter clothing items in general, or clothing items that are tighter in particular regions. This information can then be used to generate a 3-D model that, while not perfectly accurate, approximates the size and shape of consumer 122's body.

In various embodiments, computing device 126 may be a personal computer ("PC"), a laptop, a notebook, a personal digital assistant ("PDA"), a game console, a set-top box, an e-reader, a consumer electronics device, a server computer, or any other computing device capable of connecting to a network and communicating with components of environment 100.

The information describing consumer 122 collected by data acquisition flow 120 is stored in consumer database 128, which may include a database server that is accessible by server computers and other components within environment 100.

Accordingly, consumer database 128 stores, for consumer 122, body image data and a corresponding 3-D model or 3-D avatar as captured by scanner 124, as well as the results of any direct inputs (e.g., body type surveys and style preferences) entered by consumer 122 into computing device 126. Additionally, consumer database 128 may store additional information associated with consumer 122, such as purchase history for consumer 122, as well as any reviews or ratings provided by consumer 122 for purchased clothing items. The purchase history may also include indications of whether any clothing items purchase by consumer 122 were ultimately returned.

With information describing sample clothing items and consumer 122 captured by data acquisition flows 102 and 120, respectively, consumer 122 can browse and shop for clothing items.

When shopping, consumer 122 interacts with merchant system 150 using computing device 126. Merchant system 150 may include a server computer that provides various shopping application services to computing device 126 of consumer 122 over a suitably configured communications network. The server computer implementing merchant system 150 may include one or more web servers, application servers, network appliances, dedicated computer hardware devices, PCs, or any combination of these and/or other computing devices known in the art.

Consumer 122 may use a client application program executing on the computing device 126, such as a web browser, to access and utilize the services provided by the merchant system 150. Alternatively, computing device 126 may utilize any number of communication methods known in the art to communicate with merchant system 150, including Web service calls, proprietary client-server architectures, and the like. Merchant system 150 may execute a number of modules in order to provide the services to computing device 126. The modules may execute on a single server computer or in parallel across multiple server computers in merchant system 150. In addition, each module implemented within merchant system 150 may consist of a number of subcomponents executing on different server computers in merchant system 150. The modules may be implemented as software, hardware, or any combination of the two.

To begin shopping, consumer 122 browses though a number of available clothing items using computing device 126. This may involve, for example, consumer 122 accessing a web page of a merchant associated with merchant system 150 to search for and identify appealing clothing items.

Once a clothing item is selected by consumer 122, the identification of that clothing item is transmitted to merchant system 150 and, ultimately, clothing item rendering module 152 by computing device 126. Clothing item rendering module 152 is configured to then retrieve the 3-D model and any accompanying dimensional, compliance, or optical data for the identified clothing item 104 from inventory database 112. Clothing item rendering module 152 then converts the 3-D model into a rendered 3-D model of the selected clothing item and passes along the rendered 3-D model to image overlay module 154.

Avatar rendering module 156 is configured to retrieve information describing consumer 122 from consumer database 128 to generate a rendered 3-D model of consumer 122. If consumer database 128 stores 3-D body scan data for consumer 122, avatar rendering module 156 may retrieve that 3-D scan data from consumer database 128 and use the data to generate a corresponding 3-D model rendering of consumer 122. This may involve, for example, first generating a 3-D model of consumer 122 using data points retrieved from the body scan data. Then, with the 3-D model created, avatar rendering module 156 may overlay the 3-D module with 2-D photograph data (e.g., texture and graphics) of consumer 122 retrieved from consumer database 128 in order to generate the rendered 3-D model or avatar of consumer 122. In still other embodiments, however, avatar rendering module 156 may generate a 3-D rendering of consumer 122 using other data retrieved from consumer database 128. For example, if no 3-D body scan data is available, but consumer 122 has completed a body type survey and provided body dimension measurements via computing device 126, those data points may be utilized to reconstruct a 3-D model rendering that at least approximates the size and shape of consumer 122.

Image overlay module 154 is configured to receive the rendered 3-D model of the selected clothing item 104 and overlay that model onto the rendered 3-D model of consumer 122. Accordingly, image overlay module 154 first retrieves the 3-D model rendered by avatar rendering module 156. Next, image overlay module 154 retrieves the 3-D model of the selected clothing item from clothing item rendering module 152. The 3-D model of the selected clothing item 104 is then positioned over the model of consumer 122 to approximate the appearance of consumer 122 wearing the selected clothing item. This combination may be performed by any number of 3-D modeling techniques known in the art, and the methods selected may depend on the format of the data in the 3-D model of the selected clothing item and the 3-D model of consumer 122, the 3-D rendering capabilities of the merchant system 150 and/or computing device 126, and other factors. It is intended that this application include all such techniques for combining the 3-D model of the selected clothing item and the 3-D model of consumer 122 to produce the 3-D visualization representing the consumer 122 wearing the selected clothing item 104. In some embodiments, 3-D rendering techniques for both the 3-D model of consumer 122 and the 3-D model of the selected clothing item 104 may include image based rendering and/or novel view synthesis techniques, though it should be appreciated that other techniques and approaches for rendering 3-D models and modifying or deforming those models according to external environmental constraints may be utilized.

Additionally, after the 3-D image of the selected clothing item 104 is rendered by clothing item rendering module 152, dimension extraction module 157 is configured to inspect that 3-D model of clothing item 104 to derive a number of dimension measurements and compliance parameters for the selected clothing item 104.

Figure 2A:
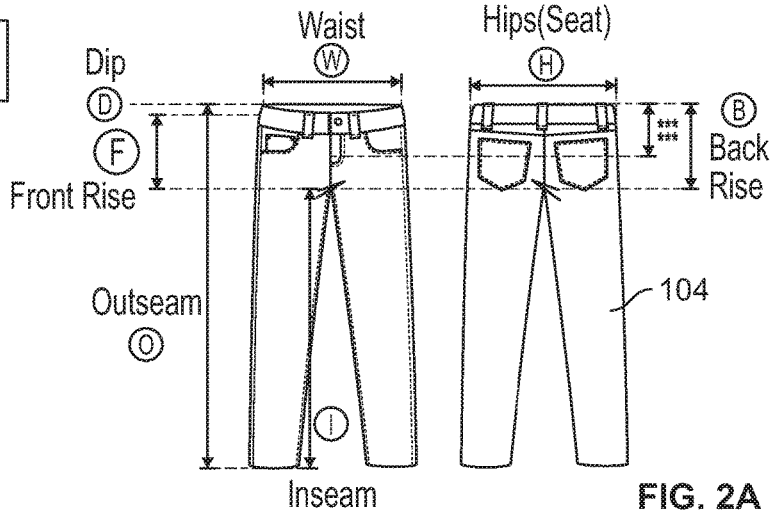
FIGS. 2A-2C illustrate dimensions of clothing items that may be determined by a dimension extraction module of a merchant system, as well as regions of clothing items for which compliance data may be stored in an inventory database.
Figure 2B:
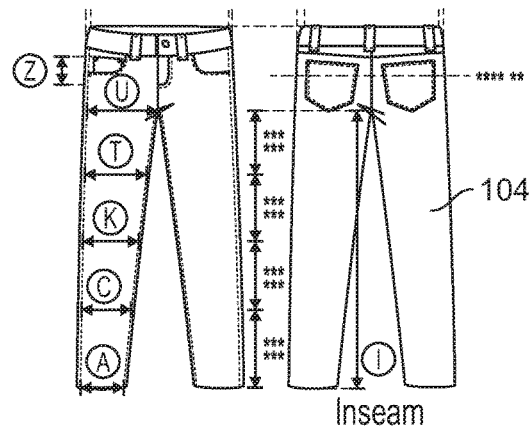
Figure 2C:
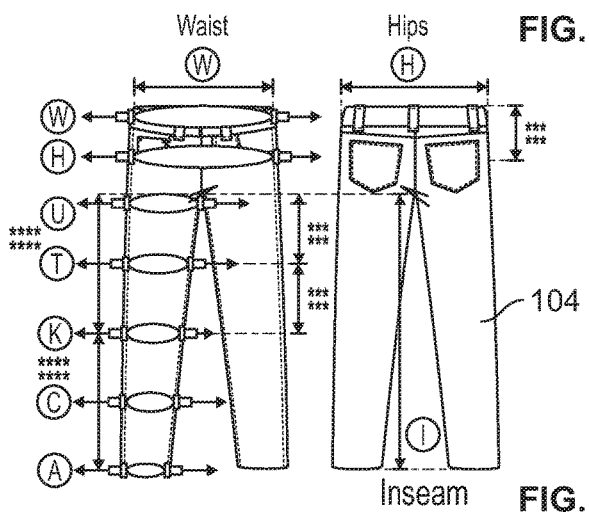

In one embodiment, for a pair of trousers, dimension extraction module 157 may retrieve 23 different dimension measurements and compliance parameters from the 3-D rendering of the selected clothing item 104 as well as additional data about clothing item 104 stored in inventory database 112. To illustrate, FIGS. 2A-2C depict dimensions of clothing item 104 that may be determined by dimension extraction module 157, as well as regions of clothing item 104 for which compliance data may be stored in inventory database 112. It should be noted that the dimensions depicted in FIGS. 2A-2C may be measured in any suitable manner. For example, the dimensions may be measured as a length or distance between points on opposing surfaces of the clothing item in the identified dimension. Alternatively, the dimension may be measured as a circumference about the clothing item in the region indicated. In still other cases, the dimensions may be measured by a 2-D area encompassed by the indicated region of the clothing item, or a 3-D volume encompassed by the clothing item at the indicated dimension. As shown in FIG. 2A, dimension measurements for a clothing item 104 including pants may include the clothing item's waist, inseam, out seam, front rise, dip, hip, and back rise dimensions. FIG. 2B depicts an additional set of dimension measurements including zipper, upper thigh, thigh, knee, calf, and ankle dimension measurements that may be captured by dimension extraction module 157. Additionally, compliance data describing the compliance of the clothing item's waist, hips, upper thigh, thigh, knee, calf, and ankle can also be retrieved from inventory database 112. The example compliance dimensions are shown in FIG. 2C. Finally, additional information describing the clothing item, such as the item's weight, and the thickness of the clothing item's fabric at the waistband and ankle may also be retrieved from inventory database 112 by dimension extraction module 157

It will be appreciated that for different clothing items (such as t-shirts, socks, or jackets), dimension extraction module 157 may be configured to retrieve different set of dimension measurements for the clothing item from a combination of the item's 3-D model and other data for the clothing item stored in inventory database 112.

Physics engine 160 is configured to receive both the dimension measurements of the selected clothing item 104, which includes the compliance characteristics of the selected clothing item 104, as well as the 3-D model depicting clothing item 104 rendered onto the 3-D avatar of consumer 122. Physics engine 160 is then configured to modify the 3-D image of the clothing item 104 on the consumer 122's avatar to provide a more realistic representation of clothing item 104, in view of how compliant the clothing item 104 is in various regions of the clothing item 104. The modification of the 3-D image of the clothing item may involve image based rendering and/or novel view synthesis techniques, though it should be appreciated that other techniques and approaches for rendering 3-D models and modifying or deforming those models according to external environmental constraints may be utilized. In some cases, physics engine 160 may additional modify the 3-D model depicting clothing item 104 onto the avatar of consumer 122 based upon atmospheric data, such as the present humidity and temperature in the approximate location of consumer 122 (the location of consumer 122 may be retrieved, for example, from consumer database 128).

With the clothing item rendered onto the 3-D model of consumer 122 and adjusted by physics engine 160, fit heuristics engine 158 determines how the clothing item will ultimately fit and flatter consumer 122. Fit heuristics engine 158 receives as input the combined 3-D rendering of the 3-D model of consumer 122 and the 3-D model of the selected clothing item, the fit and style preferences from consumer database 128, as well as the dimension measurements and compliance parameters of the selected clothing item 104 identified by dimension extraction module 157.

Using that information, heuristics engine 158 calculates a fit description for the clothing item for consumer 122. The fit description generally includes, for different regions of the clothing item 104, an indication of whether the clothing item 104 will fit well, be loose, or be tight.

The fit description may be generated by fit heuristics engine 158 by first determining for each of the dimension measurements received from dimension extraction module 157 whether the dimension measurement represents a tight, loose, or normal fit. For example, for a pair of trouser, fit heuristics engine 158 may compare each of the waist, inseam, out seam, front rise, dip, hips, back rise, zipper, upper thigh, thigh, knee, calf, and ankle dimension measurements retrieved from the 3-D model of clothing item 104 with comparable dimension measurements retrieved from the avatar 3-D model of consumer 122. It will be appreciated that fit heuristics engine 158 may use many different criteria for calculating a fit description for a particular clothing item and a particular consumer 122. For example, different criteria may be used for each dimension measurement to determine whether the clothing item is a tight, normal, or loose fit at that dimension.

Additionally, the style preferences of consumer 122 may also be used to adjust the criteria that are used to determine whether a particular clothing item 104 would have a tight, normal, or loose fit in particular regions. For example, if consumer 122 has specified a preference for "skinny" style trousers, fit heuristics engine 158 may be configured to implement criteria reflecting that preference. In determining style preferences of consumer 122, in some embodiments, heuristics engine 158 may also consider the style preferences of other consumers 122 having a similar body shape to that of consumer 122. For example, if consumer 122 has not supplied or provided any fit preferences (or an incomplete set of fit preferences), the preferences of other consumers 122 in consumer database 128 may be used to derive a best-guess set of fit preferences for consumer 122.

Additionally, fit heuristics engine 158 may adjust the tight, normal, loose fit criteria based upon the compliance of the material making up the clothing item. If the material is more compliant—indicating that the fabric of clothing item 104 will tend to stretch further than less compliant clothing items—the fit criteria can be relaxed so that a greater range of dimension measurements will be considered a normal fit, because even if the clothing item 104 is a little tight, it will stretch and so won't feel so tight to consumer 122. Conversely, if the clothing item is not compliant—the fabric tends to not stretch—the fit criteria may be constrained so that a narrower range of dimension measurements will be considered a normal fit.

Fit presentation formatting module 162 receives both the modified depiction of the clothing item rendered onto a 3-D avatar of consumer 122 from clothing item physics engine 160 and the fit description from fit heuristics engine 158. Fit presentation formatting module 162 changes the modified depiction of the clothing item on the avatar of consumer 122 by adding an overlaying heat map. The configuration of the heat map is based upon the fit description received from fit heuristics engine 158. Regions of clothing item 104 that may represent a tight fit are rendered using a first color of the heat map. Similarly, regions of clothing item 104 that may represent a loose fit are rendered using a second color of the heat map. The modified depiction of clothing item 104 on the 3-D model avatar of consumer 122 in combination with the overlaid heat map depicting tight and loose regions of the clothing item are transmitted for display to consumer 122 on computing device 126.

The heat map enables consumer 122 to select clothing items 104, not only based upon a small number of dimensions of clothing item 104 being compatible with those of the consumer (in conventional approaches a consumer may only compare waist and length of a pair of jeans, for example) but upon the actual appearance of the clothing item 104 of the avatar of consumer 122. In turn, this can enable consumer 122 to shop for, identify, and select clothing items 104 that will flatter the consumer 122's body, rather than merely fit the consumer 122's body.

Figure 3:
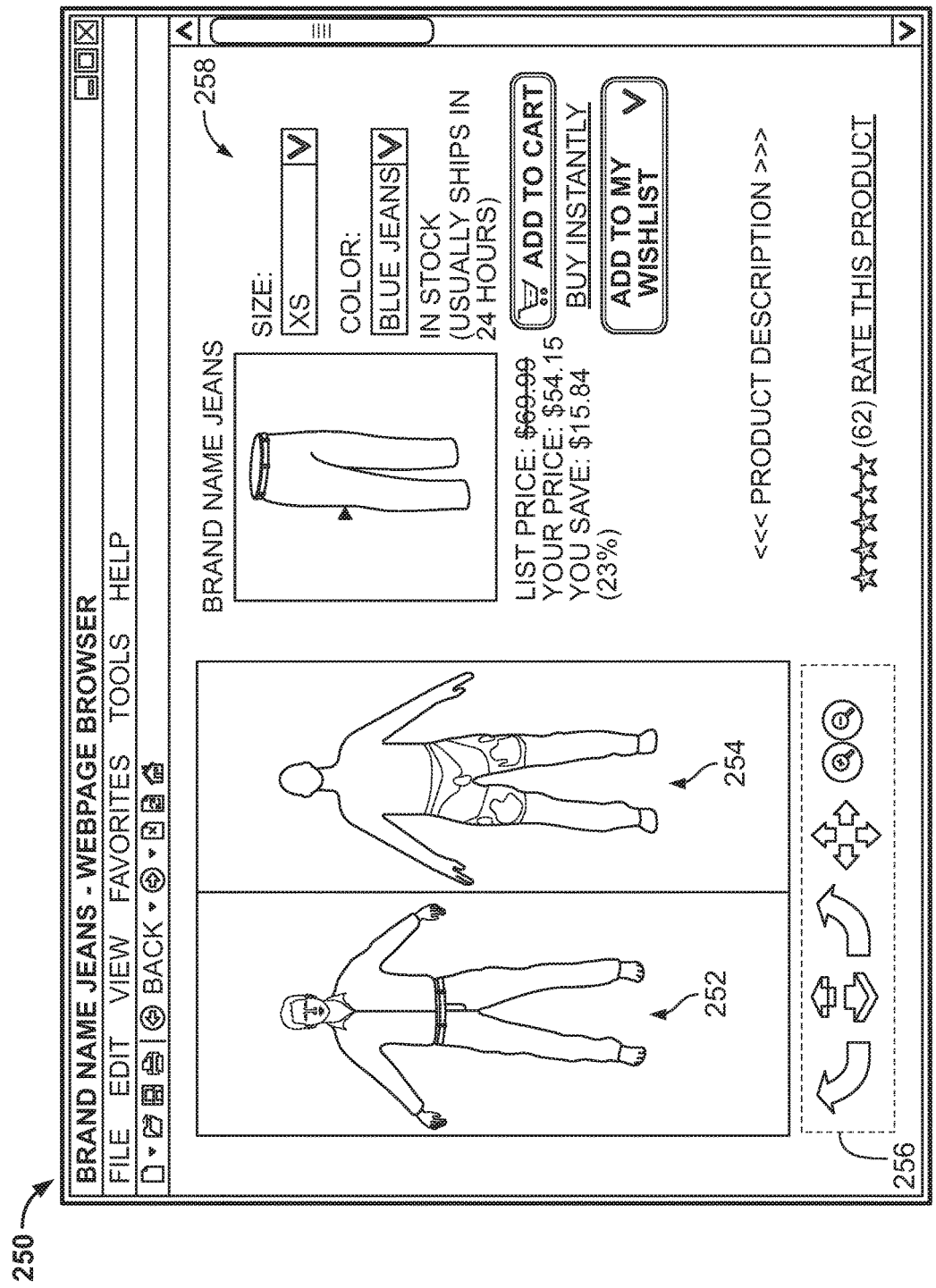
FIG. 3 depicts an example user interface that may be displayed for a consumer to depict a rendered 3-D model of a clothing item over a rendered 3-D model of the consumer.

FIG. 3 depicts an example user interface 250 that may be displayed for consumer 122 that includes the modified depiction of the clothing item on the avatar of consumer 122 in combination with an overlaid heat map depicting tight and loose regions of the clothing item. Using user interface 250, consumer 122 can view both a 3-D visualization 252 or 3-D model of the clothing item overlaid with the consumer's avatar as well as heat map 254. Heat map 254 uses different colors to indicate to consumer 122 which regions of the clothing item may feel loose or tight. A number of user interface elements 256 enable the consumer to interact with the displayed information by manipulating the display to see different views of clothing item 104 and corresponding heat map. User interface 250 also include general clothing item information pane 258 that display attributes of the clothing item and enables consumer 122 to modify the clothing item selection by modifying a size and style of the clothing item to be depicted as well as provide feedback on the clothing item being depicted.

It will be appreciated that any suitable interface methods may be utilized to allow consumer 122 to interact with the 3-D visualization 252 of the clothing item and heat map 254, according to the capabilities of computing device 126. For example, computing device 126 may be connected to a motion-capture camera input system attached that is capable of measuring the position and orientation of the consumer's body in real-time. The motion-capture camera input may be used to correspondingly manipulate the position and orientation of the 3-D visualization 252 of the clothing item and heat map 254, allowing consumer 122 to visualize the fit, flow, and texture of the clothing item from a particular angle, with their arms raised, or while bending over, for example. Other input devices and interaction methods will be apparent to one skilled in the art, including, but not limited to, traditional game pads, trackballs, touch-screens, gyroscopic controllers, motion sensing controllers, and the like.

Additional interactions with the 3-D visualization 252 of the clothing item 104 over the avatar of consumer 122 and heat map 254 may be provided through the user interface provided by computing device 126, according to further embodiments. For example, consumer 122 may be able to select multiple clothing items 104 from a list of items and place them on the 3-D avatar in the 3-D visualization in order to see how the clothing items layer or interact. The user interface provided by computing device 126 may include a drag-and-drop capability of clothing items 104.

To assist consumer 122 in identifying clothing items 104 in the merchant's inventory that may be suited to consumer 122, environment 100 includes inventory filter module 164. Inventory filter module 164 receives as input the fit description for the presently-viewed clothing item 104 from fit heuristics engine 158 in combination with fit and compliance data for other clothing items 104 from inventory database 112. Inventory filter module 164 uses the current fit description to identify other clothing items 104 in inventory database 112 that may provide a similar fit and feel as that of the clothing item 104 currently being viewed. This may involve identifying clothing items 104 in inventory database 112 that have a combination of geometry and compliance attributes that would result in a similar heat map—that is, similar regions of tight, normal, and loose fit—as the current clothing item 104 being viewed. Because inventory filter module 164 is configured to take into account compliance data, inventory filter module 164 may identify clothing items 104 that, even though different in their size and shape, may result in a similar fit and fit (i.e., heat map) as the currently-viewed clothing item 104.

The list of other clothing items 104 in the merchant's inventory that may be suited to consumer 122 is then passed to a presentation sorting module 166 that optimizes an order in which the other clothing items 104 may be display for review by consumer 122. This may involve presentation sorting module 166 selecting an appropriate display order for the related clothing items 104 based upon any combination of attributes of the related clothing items 104. For example, the related clothing items 104 may be sorted based upon the similarity of each related clothing item 104 to the clothing item 104 currently being viewed. Similarity could be determined based upon a combination of factors, such a comparison of the primary colors in the various clothing items 104, the costs of the various clothing items 104, the manufacturers of the various clothing items 104, and the like. The related clothing items may also be sorted based upon other information retrieved from consumer database 128 or inventory database 112, such as other consumers' reviews of the related clothing items or the purchase histories of the related clothing items.

Once prepared, the listing of related clothing items 104 identified by inventory filter module 164 and sorted by presentation sorting module 166 can be displayed using computing device 126 for review by consumer 122.

Consumer 122 may then select one or more of the displayed related clothing items 104, which causes environment 100 to generate a new 3-D rendering of the selected clothing item on the 3-D model of consumer 122. The new rendering is transmitted to computing device 126 for display to consumer 122.

In some cases, an alternative clothing item 104 may be selected through a conventional browse and search user interface of computing device 126, or from selected clothing item sets or types known to be complementary or compatible with the originally-selected clothing item 104. In a further embodiment, consumer 122 may scan or otherwise identify or describe a number of their own clothing items for which the inventory filter module 164 may generate and identify a number of related clothing items 104. In such an embodiment, these consumer-specific clothing item details may be stored in a profile of consumer 122 in consumer database 128.

Figure 1B:
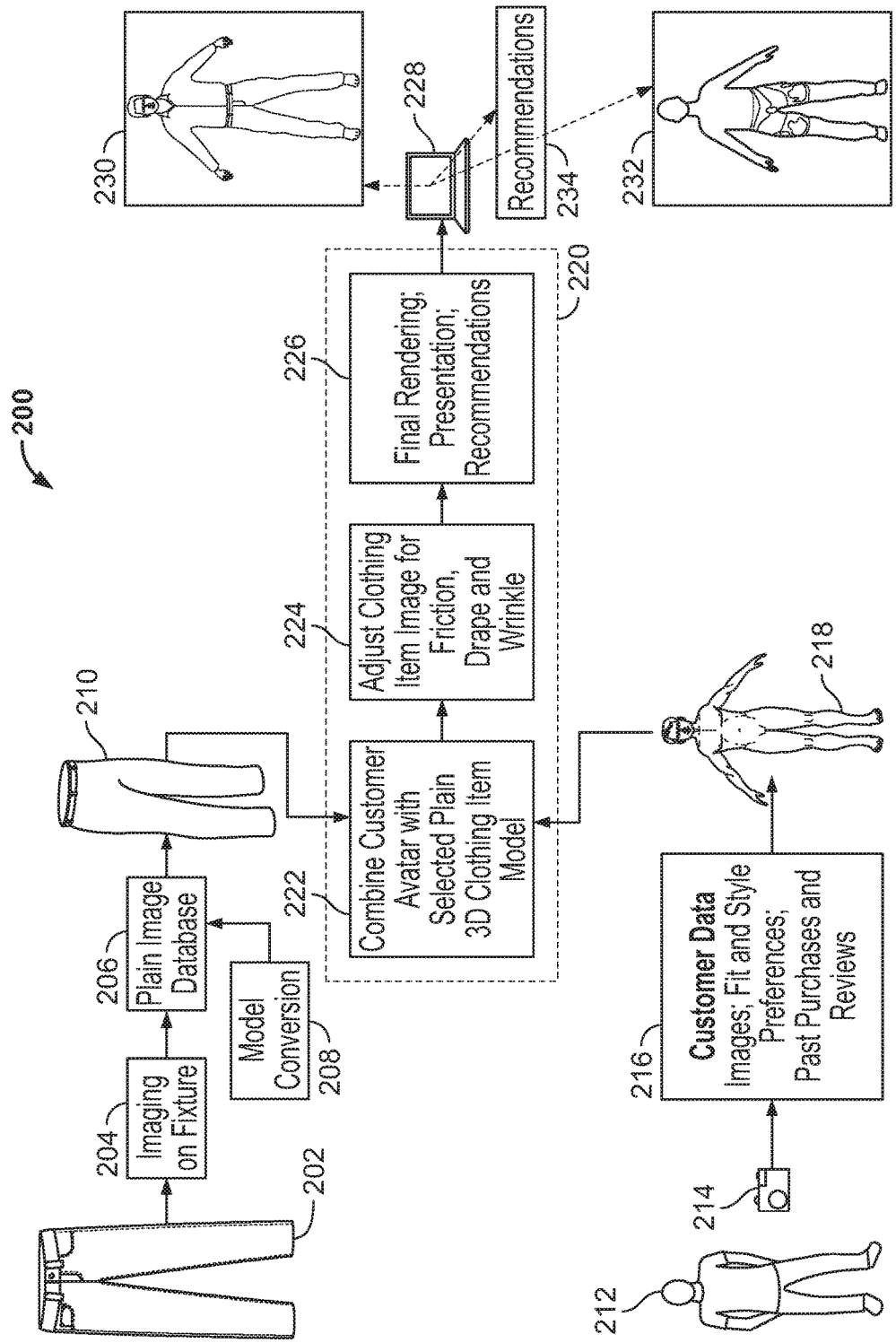
FIG. 1B is a system diagram depicting an alternative configuration of an operating environment in which embodiments of the present system may be implemented.

FIG. 1B depicts an alternative environment 200 in which the embodiments described herein may be implemented. In particular, FIG. 1B is a system diagram that shows an illustrative operating environment 200 including several software and hardware components for providing visualization of fit and flow of clothing, according to embodiments provided herein. The system implemented within environment 200 may further provide assistance to a consumer in shopping for clothing items, as detailed below. Environment 200 includes two data acquisition flows. In the first, data describing a clothing item 202 is captured. Clothing item 202 is placed upon test fixture 204 and images of clothing item 202 are captured. Those images, one captured may be stored in plain image database 206 along with other data describing attributes of clothing item 202 such as the dimension measurements and compliance clothing item 202 over particular dimensions. In embodiments, further attributes and data describing clothing item 202 may be retrieved from a 3-D model conversion 208 of clothing item 202. 3-D model conversion 208 may be configured to generate a 3-D model of clothing item 202 using any suitable 3-D modeling and rendering techniques applied to data captured while clothing item 202 is imaged on the test fixture 204. The output of 3-D model conversion, in combination with the images stored in plain image database 206 is a 3-D model of clothing item 202 that includes textured or rendered surface, resulting 3-D model 210 of clothing item.

In a second data acquisition flow, data describing consumer 212 is captured. In one embodiment, a 3-D model of consumer 212 is captured by imaging device or scanner 214. The 3-D model may include, for example, a 3-D point cloud that, in combination with 2-D images of consumer 212 captured by scanner 214, may be used to generate a 3-D model of consumer 212 that include a textured or rendered surface. Once captured, the 3-D model or avatar of consumer 212 is stored in consumer database 216. Consumer database 216 may store additional information that may be useful in making clothing item recommendations for consumer 212. For example, consumer database 216 may also store fit and style preferences of consumer 212. In some embodiments, consumer database 216 may also store purchase and review history of consumer 212, which can be used to tailor recommendations of clothing items to be more in-line with prior clothing item purchases that consumer 212 has rated highly.

The data stored in consumer database 216 is used to generate a 3-D model 218 or avatar of consumer 212. This may involve, for example, retrieving the textured 3-D model of consumer 212 from consumer database 216 that was generated by scanner 214. In some cases, 3-D model 218 of consumer 212 may be modified or adjusted based upon other information stored in consumer database 216, such as style and fit preferences of consumer 212, which may include information provided by consumer 212 regarding actual dimension measurements and shapes of the body of consumer 212.

Rendering engine 220 is configured to retrieve 3-D model 210 of clothing item 202 and 3-D model 218 of consumer 212 and combine those two 3-D models to generate an output that includes a 3-D model that depicts 3-D model 218 of consumer 212 wearing 3-D model 210 of clothing item 202. When generating the output rendering engine 220 may implement one or more intermediary steps in order to modify one or more of 3-D model 210 and 3-D model 218 in order to modify the output of rendering engine 220 to more accurately depict clothing item 202 on consumer 212. For example, in an embodiment, rendering engine 220 first combines the two 3-D models in step 222. This may involve, for example, rendering engine 220 identifying anchor points (e.g., through the analysis of a semantic machine learning engine) on both 3-D model 210 and 3-D model 218 in order to accurately locate one 3-D model upon the other to generate a combined 3-D model of clothing item 202 and consumer 212.

With the models combined in step 222, rendering engine 220 implements an adjustment step 224 in which 3-D model 210 of clothing item 202 is adjusted and modified based upon an analysis of how clothing item 202 would sit upon consumer 212. This may involve, for example, analyzing both the dimension measurements of clothing item 202 captured by test fixture 204 as well as the compliance of clothing item 202 in different regions of clothing item 202. With 3-D model 210 of clothing item 202 adjusted, a final output rendering is generated by step 226 that depicts clothing item 202 on consumer 212, where the depiction of clothing item 202 has been adjusted to depict how clothing item 202 would actually sit upon the body of consumer 212.

That final rendering can be transmitted from rendering engine 220 to computing device 228 of consumer 212 for display (see rendering 230). In some embodiments, rendering engine 220 may also generate a heat map (see heat map 232) that indicates which regions of clothing item 202 are likely to feel tight and loose to consumer 212. Heat map 232 can be transmitted to computing device 228 for display to consumer 212. Finally, a number of recommendations 234 may also be generated for consumer 212 and displayed on computing device 228. Recommendations 234 may include a listing of other clothing items 202 (i.e., not the clothing item 202 currently being viewed by consumer 212) that consumer 212 may wish to view. The recommended clothing items may include other clothing items having a similar fit to clothing item 202 currently being viewed and/or other clothing items that satisfy the style and fit preferences of consumer 212.

As described above in FIG. 1A, in order to generate an accurate rendering of a 3-D model of the clothing items 104 of inventory database 112 over a 3-D avatar of consumer 122, fit test fixture 106 working in conjunction with scanner 108 should generate accurate measurements not only of the size and shape of clothing items 104, but also measurements of the compliance of clothing items 104 in particular regions or along particular dimensions of clothing items 104.

Accordingly, a number of different fit test fixtures are provided in the present disclosure. The fit test fixtures are generally configured to be inserted into a particular clothing item. The fit test fixture can then be expanded or inflated to at least partially occupy or inhabit an interior volume of the clothing item. With the clothing item inhabited by the fit test fixture, the fit test fixture may approximate the shape of an individual wearing the particular clothing item. Comprehensive 3-D data, imagery, and photographic data is then captured of the inhabited clothing item. That data can then be analyzed, as described below, to determine the particular size and shape of the clothing item, including the determination of specific dimension measurements of the clothing item.

Additionally, as described below, this process may be used to also determine compliance attributes of the clothing item. As the fit test fixture is expanded or inflated, the dimensions of the clothing item will change over time. Initially, the clothing item with expand rapidly and at a linear rate according to the rate at which the fit test fixture is expanded or inflated. Eventually, however, the clothing item will be fully inhabited and the fabric of the clothing item will constrain the expansion or inflation of the fit test fixture. This will, in turn, result in the internal air pressure (if being inflated) of the fit test fixture to increase more rapidly than while the clothing item was filling. This more rapid increase of air pressure of the fit test fixture, in combination with measurements of how quickly specific dimensions of the clothing item are changing at the same time can be used, as described below, to derive a level of compliance of the clothing item in certain regions of the clothing item.

Figure 4:
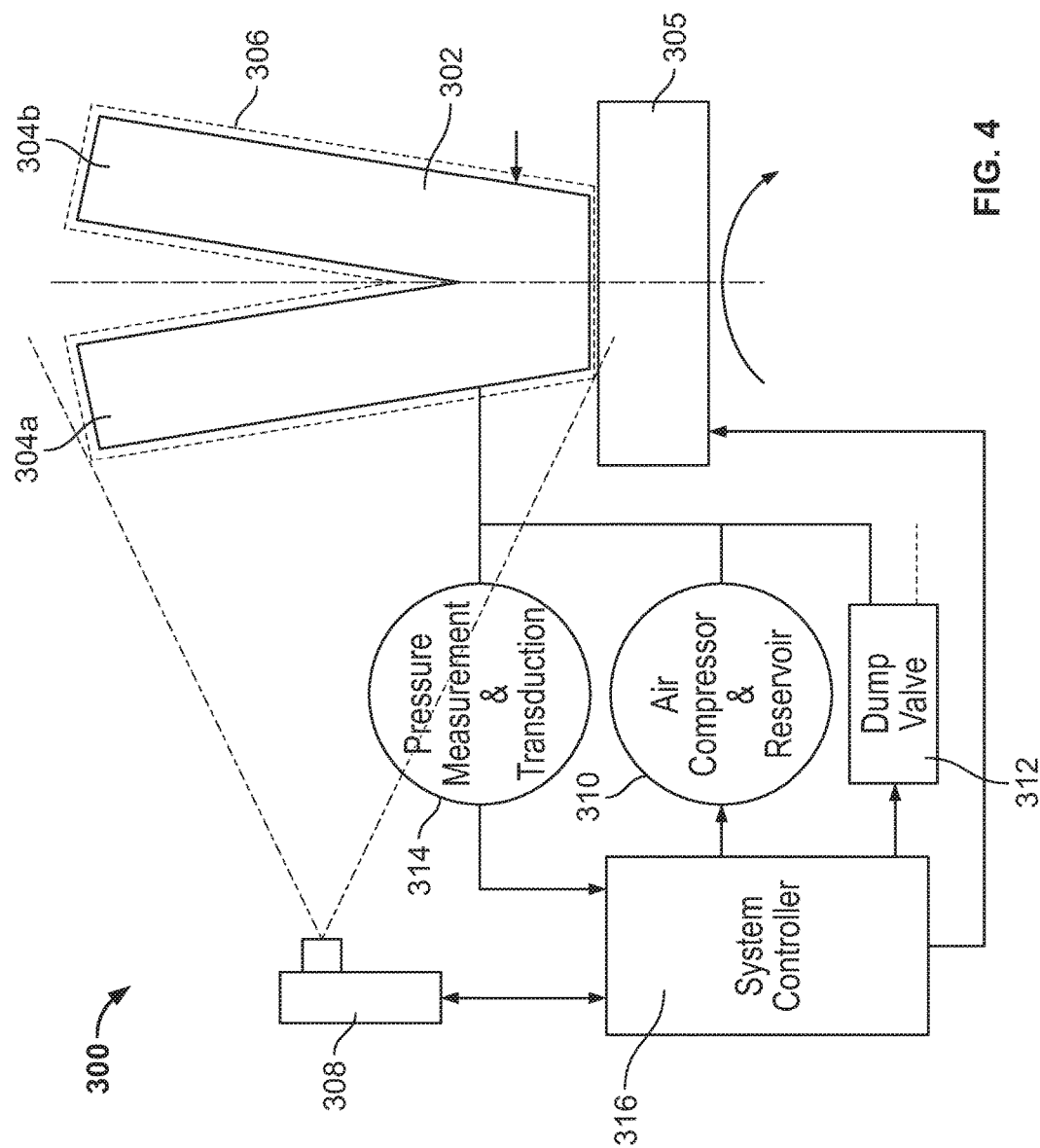
FIG. 4 depicts an embodiment of a fit test fixture for measuring dimensions and compliance of a clothing item.

FIG. 4 depicts an embodiment of fit test fixture 300 for measuring dimension measurements and compliance of a clothing item. In the depicted example, fit test fixture 300 is configured to measure attributes of a pair of trousers. It will be apparent, however, that the shape of fit test fixture 300 may be modified to generate similar measurements of other clothing items such as t-shirts, shirts, sweaters, shorts, and other items to be worn, such as socks, gloves, hats and the like.

Fit test fixture 300 includes air bladder 302. Air bladder 302 may include any suitable materials, such as rubber, polyurethane, latex, and the like, and combinations thereof. Air bladder 302 is constructed to include two separate projections 304a and 304b. When a pair of trousers 306 is installed onto fit test fixture 300, projections 304a and 304b, in a deflated state, are inserted into the legs of trousers 306 so as to occupy or inhabit the legs of trousers 306. A dashed line depicts the positioning of a pair of trousers 306 over fit test fixture 300.

Air bladder 302 may be formed with projections 304 in any suitable manner. For example, if air bladder 302 is fabricated using a molding process, the mold may define the size and shape of projections 304 in air bladder 302. Alternatively, air bladder 302 may be fabricated from a number of different sections that, once assembled, formed a shape including projections 304. Projections 304 are in fluid communication with one another and, when air bladder 302 is inflated, projections 304 separately inflated to inhabit the individual legs of trousers 306. Accordingly, by incorporating two or more different projections 304 into air bladder 302, air bladder 302 can be fabricated to more effectively inhabit the different volumes defined by a clothing item. For example, and air bladder 302 may be fabricated with projections 304 configured to be inserted into the arm of a shirt that is being tested upon fixture 300.

Air bladder 302 is mounted to turntable 305, which is configured to rotate air bladder 302 about an axis running vertically up through air bladder 302. The rotation of turntable 305 enables scanner 308 to capture a 360 degree view of trousers 306 positioned over air bladder 302 as turntable 305 rotates.

Air compressor 310 is connected to air bladder 302. Air compressor 310 is a system configured to pump air into air bladder 302. In an embodiment, air bladder 302 is configured to pump air at a known rate which can, in some cases, facilitate the measurement of compliance attributes of trousers 306. Dump valve 312 is connected to air bladder 302 and, when enabled or opened, allows air to be removed from air bladder 302, thereby facilitating the removal of trousers 306 from fit test fixture 300 and enabling another pair of trousers 306 to be installed onto fit test fixture 300 and tested.

Air pressure sensor 314 is connected to air bladder 302 and is configured to measure an air pressure of the volume defined within air bladder 302.

Controller 316 is connected to each of air compressor 310, dump valve 312, air pressure sensor 314, and turntable 305 to either control the operation of or capture data from each of those components. Accordingly controller 316 can, after a pair of trousers 306 has been installed over fit test fixture 300, cause air compressor 310 to pump air into air bladder 302. As air bladder 302 inflates, controller 316 can initiate rotation of turntable 305 enabling scanner 308 to capture 360 degree views of trousers 306 as trousers 306 expand due to the inflating air bladder 302. Additionally, while air bladder 302 inflates, controller 316 can capture measurement of the air pressure in air bladder 302 over time from pressure sensor 314. As discussed below, the measurement of air pressure over time may facilitate the derivation of compliance data for trousers 306.

As depicted, scanner 308 is positioned to capture 3-D photographs or other imaging data and depth values of fit test fixture 300 and trousers 306 placed thereon. Scanner 308 may be configured, for example, to capture multiple photographic images of fit test fixture 300 and trousers 306 from a single location, while turntable 305 is rotated, enabling data capture from multiple, varying angles of trousers 306. Alternatively, scanner 308 may include a plurality of cameras positioned about fit test fixture 300 to capture a 360 degree view of trousers 306.

With the visual data captured, 3-D modeling software may then be used to synthesize a 3-D model from the captured image data. That 3-D model of trousers 306 can then be inspected to determine particular size and compliance attributes of trousers 306. In still other embodiments, scanner 308 may include a combination of active and/or passive 3-D scanners that could be used to obtain the 3-D model directly from fit test fixture 300. In one specific embodiment, scanner 308 has a vertical field of vision of approximately 90 degrees and a horizontal field of vision of approximately 45 degrees. According to one embodiment, visual recognition logic may be employed by scanner 308 and/or controller 316 during the 3-D scanning process to obtain the dimension measurements and compliance data of trousers 306.

During testing, scanner 308 may be configured to continually capture data about trousers 306 on fit test fixture 300 and, using that data, continually update and generate a 3-D model of trousers 306. That substantially real-time 3-D model of trousers 306 can then be retrieved and processed by controller 316 as needed.

In a specific embodiment, with air bladder 302 fully inflated and a 3-D model of trousers 306 captured by scanner 308, the 3-D model can be inspected by controller 316 to identify a number of specific dimension measurements of trousers 306. Referring back to FIG. 2, for example, the 3-D model can be used to determine waist, inseam, out seam, front rise, dip, hips, back rise, zipper, upper thigh, thigh, knee, calf, and ankle dimension measurements for trousers 306. Various techniques may be used to inspect the 3-D model of trousers 306 in order to determine dimension measurements thereof. In one embodiment, for example, a semantic machine learning engine may be trained to identify particular anchor points within the 3-D model of trousers 306. The anchor points represent known locations on trousers 306 and, once identified by the machine learning engine, can be used to determine the various dimension measurements of trousers 306. Once captured, that data can be stored, for example, in inventory database 112 of FIG. 1A and/or provided to clothing item rendering module 152 and fit heuristics engine 158 for processing as described above.

Additionally, by monitoring changes to the shape of trousers 306 over time via the corresponding 3-D model captured by scanner 308, compliance data for trousers 306 can be determined.

Figure 5:
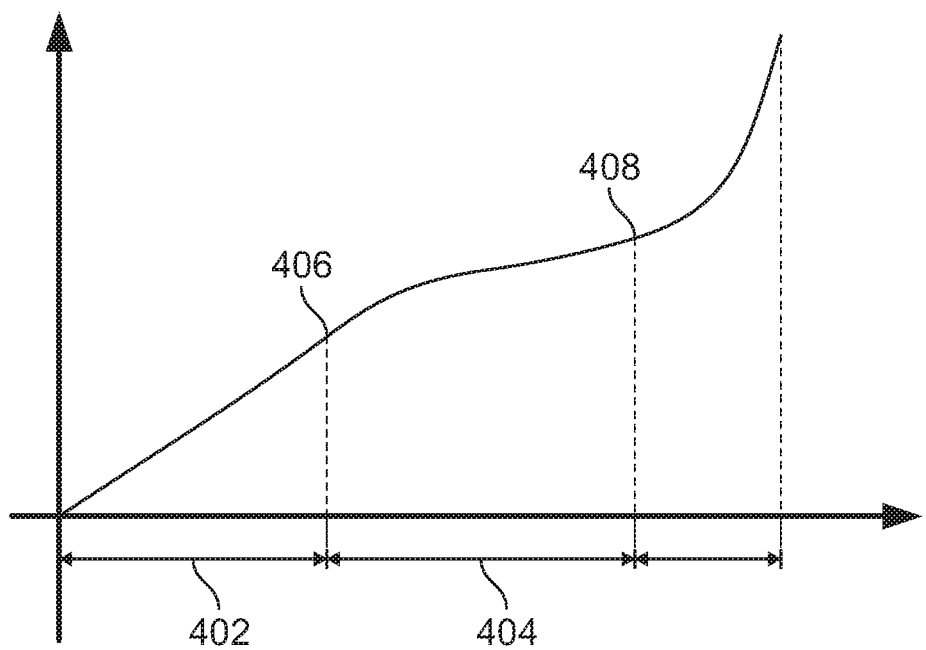
FIG. 5 is a graph depicting force versus displacement measurement along a particular dimension of a clothing item.

As air bladder 302 is inflated, the rate at which trousers 306 themselves expand will change over time. This behavior is illustrated by FIG. 5, which is a graph depicting force versus displacement for a particular region of trousers 306. In the graph of FIG. 5, the horizontal axis represents force. The vertical axis represents a length of a particular dimension (e.g., the thigh measurement of trousers 306 as depicted in FIG. 2) of the clothing item being tested. Initially, when air bladder 302 first begins inflating and trousers 306 are slack over air bladder 302, the dimension of trousers 306 will expand linearly in accordance with the force being exerted on trousers 306 by air bladder 302. This is depicted by region 402 of the graph. Eventually, however, air bladder 302 will have expanded within trousers 306 to a point that air bladder 302 fills the volume defined by trousers 306. At this point, the fabric of trousers 306, which has not yet begun to stretch, will begin to constrain the expansion of air bladder 302 and slow the expansion of the dimension of trousers 306 being observed in response to a constant increase in the force being applied. This occurs at point 406 in FIG. 5.

As air continues to be fed into air bladder 302, trousers 306 will continue to expand, but this expansion does not come from air bladder 302 filling slack within trousers 306 and instead the expansion comes from the material of trousers 306 stretching. As depicted in FIG. 5, this occurs during region 404 of the graph. During region 404, the expansion in the depicted dimension of trousers 306 is no longer linear and may not correspond directly to a rate at which air is fed into air bladder 302. Accordingly, in region 404, the length of trousers 306 along the dimension being monitored does not increase by the same amount in response to a given increase in force being exerted as in region 402.

Eventually, the fabric of trousers 306 will have stretched to a maximum point at which the fabric can no longer stretch further. At this point (depicted by point 408 in FIG. 5), the fabric of trousers 306, rather than stretching, will begin failing as the amount of force applied to trousers 306 increases. Eventually regions within the fabric of trousers 306 will fracture causing failure of the fabric. At that point, with trousers 306 ripped, the dimension expands rapidly in response to changes in force as the fabric no longer impedes the expansion of air bladder 302.

Figure 6:
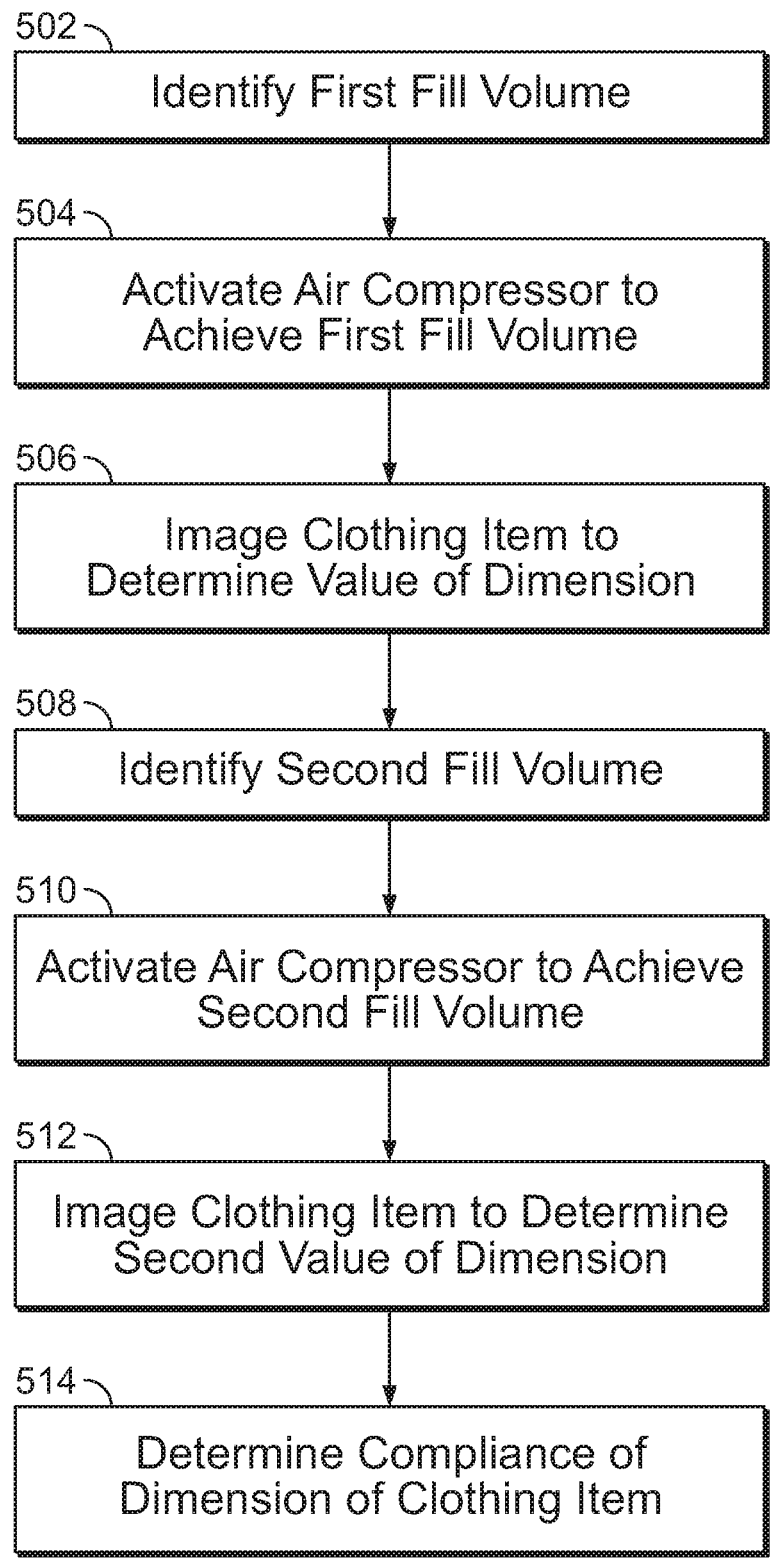
FIG. 6 is a flow chart depicting a method for a controller to determine compliance attributes of a clothing item along a particular dimension.

FIG. 6 is a flow chart depicting a method for controller 316 to determine compliance attributes of trousers 306 along a particular dimension. A pair of trousers 306 to be tested have been installed over fit test fixture 300. In step 502, controller 316 identifies a first fill volume for trousers 306 being tested. The first fill volume is a value controller 316 uses to determine an amount of air to be pumped into air bladder 302 of fit test fixture 300 to provide that trousers 306 are just-filed by the expanded air bladder 302. As such, the first fill volume can specify a level of inflation of air bladder 302. The just-filled state of trousers 306 ensures that trousers 306 are fully inhabited by air bladder 302, but that the fabric of trousers 306 has not yet begun to stretch significantly. The first fill volume may be stored, for example, in a look-up table contained within a memory of controller 316 or otherwise accessible to controller 316. The look-up table may specify, for example, for a particular type of clothing to be mounted to fit test fixture 300, a volume of air that should be pumped into air bladder 302 to achieve the just-filled state, a time duration for which air compressor 310 should be run to achieve the just-filled state, or an air pressure of air bladder 302 that indicates the clothing item being tested is at the just-filled state. Table 1, below, shows an example look-up table that may be used by controller 316 to determine the first fill volume for trousers 306. Table 1 specifies, for each of a number of different clothing item types (in this example, the table only includes fill volume values for different type of trousers), first fill volume value. In this example, the first fill volume values are specified as pounds per square inch (psi) values.

TABLE 1

| Clothing Item Type | First Fill Volume (psi) | Second Fill Volume (psi) |
| --- | --- | --- |
| Jeans | Xxx psi | Yyy psi |
| Dress Pants | Xxx psi | Yyy psi |
| Yoga Pants | Xxx psi | Yyy psi |

In step 504 controller 316 inflates air bladder 302 according to the first fill volume determined in step 502. This may involve, for example, controller 316 activating air compressor 310 to pump air into air bladder 302 until pressure sensor 314 measures a particular psi value for air bladder 302.

Once the first fill volume of air bladder 302 is achieved, in step 506 controller 316 retrieves a 3-D model of trousers 306, as currently filled by air bladder 302, from scanner 308. Controller 316 then determines the value of the dimension of trousers 306 currently being inspected by controller 316. For example, controller 316 may determine a length of the thigh dimension of trousers 306, as that dimension is depicted in FIG. 2B.

With the dimension measurement determined, in step 508 controller 316 identifies a second fill volume for trousers 306 being tested. The second fill volume is a value controller 316 uses to determine an amount of air to be pumped into air bladder 302 of fit test fixture 300 to provide that the fabric of trousers 306 is stretched by the expanded air bladder 302 to some degree. As such, the second fill volume can specify a level of inflation of air bladder 302. The second fill volume may be stored, for example, in the same look-up table as the first fill volume contained within a memory of controller 316 or otherwise accessible to controller 316. The second fill volume may be specified as a volume of air that should be pumped into air bladder 302 to achieve the stretched state of clothing item 104, a time duration for which air compressor 310 should be run to achieve the stretched state, or an air pressure of air bladder 302 that indicates the clothing item being tested is at the stretched state. For example, the third column of Table 1, above, specifies second fill volume values in psi.

In step 510 controller 316 inflates air bladder 302 according to the second fill volume determined in step 508. This may involve, for example, controller 316 activating air compressor 310 to pump air into air bladder 302 until pressure sensor 314 measures a particular psi value for air bladder 302 specified by the second fill volume value.

After the second fill volume of air bladder 302 is achieved, in step 512 controller 316 retrieves a second 3-D model of trousers 306, as currently filled by air bladder 302, from scanner 308. Controller 316 then determines the value of the dimension of trousers 306 currently being inspected by controller 316.

In step 514, controller 316 analyzes the dimension measurements of trousers 306 captured in steps 506 and 512 to determine a distance that trousers 306 stretched along the dimension measurement being monitored. This information can then be used to determine a compliance of trousers 306 over that dimension, which may be represented as a ratio of force applied to trousers 306 in that dimension, to a distance that trousers 306 stretched in response to the application of that force.

The method of FIG. 6 may be performed by controller 316 in multiple parallel instances to determine a compliance of trousers 306 in multiple regions or along multiple dimensions at essentially the same time.

Figure 7:
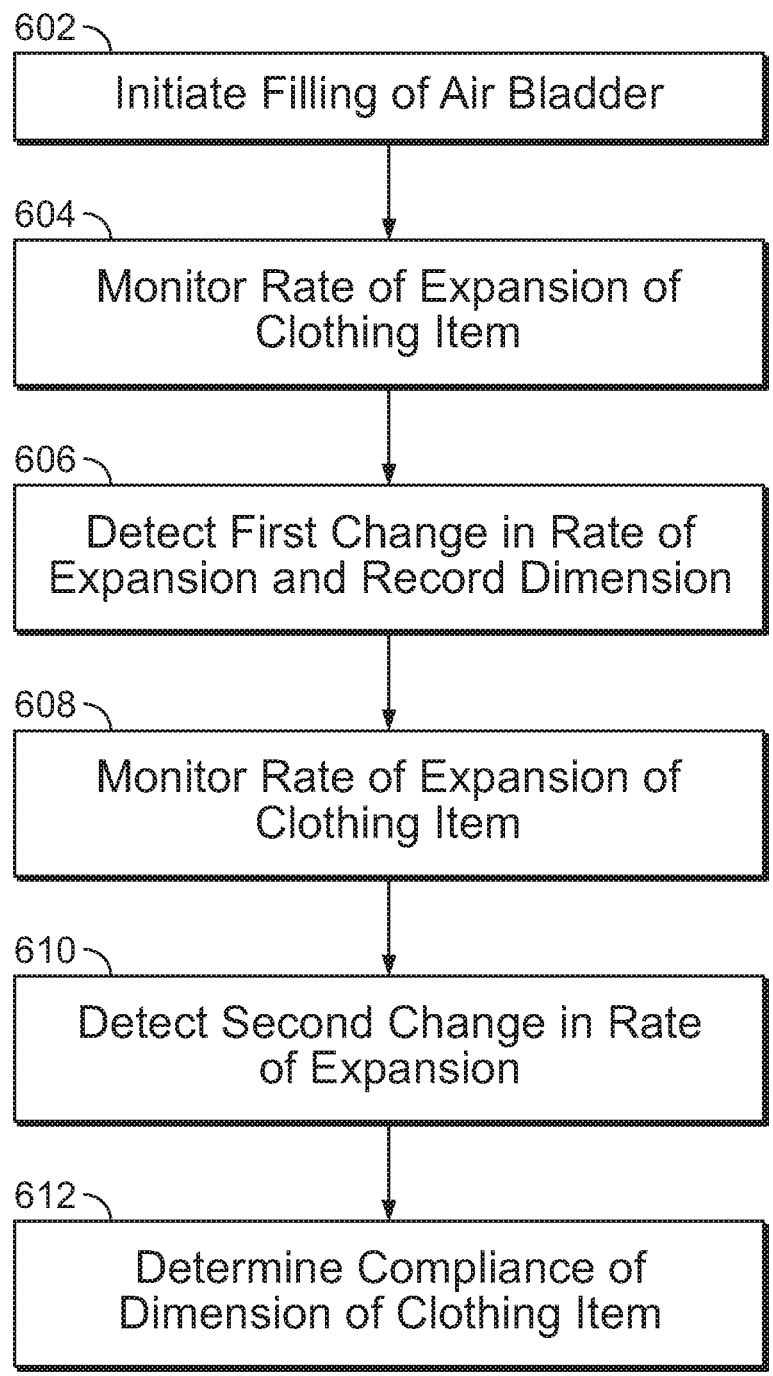
FIG. 7 is a flow chart depicting an alternative method for a controller to determine compliance attributes of a particular dimension of a clothing item positioned on a fit test fixture.

FIG. 7 is a flow chart depicting an alternative method for controller 316 to determine compliance attributes of a particular dimension of trousers 306 positioned on fit test fixture 300. A pair of trousers 306 to be tested have been installed over fit test fixture 300. In step 602, controller 316 begins filling air bladder 302 with a constant flow of air. Throughout the entire execution of the method of FIG. 7, air is fed into air bladder 302 at a constant rate.

With air bladder 302 filling, controller 316, in step 604 monitors the expansion of trousers 306. This may involve, for example, controller 316 monitoring the rate of expansion of a specific dimension of trousers 306. At the beginning of the method of FIG. 7, when air bladder 302 is first filling, the dimension of trousers 306 will increase at a relatively constant rate.

In step 606, controller 316 detects that the rate of change of a dimension of trousers 306 has changed. That indicates the trousers 306 are fully inhabited by air bladder 302. At this point (corresponding to point 406 on FIG. 4), further increases in the dimension of trousers 306 is due to the fabric of trousers 306 stretching. In this step, the length of the dimension of trousers 306 being monitored is recorded by controller 316.

After the detection of the first change in the rate of expansion of the dimension being monitored, in step 608 controller 316 continues filling air bladder 302 and monitoring of the expansion of trousers 306.

Eventually, the fabric of trousers 306 has stretched to its maximum capacity, thereby inhibited further expansion in the volume of air bladder 302. This is detected in step 610 by controller 316 as a second change in the rate of expansion in trousers 306 and corresponds to point 408 depicted in FIG. 5. Again, in this step, the length of the dimension of trousers 306 being monitored is recorded by controller 316.

In step 612, controller 316 analyzes the dimension measurements of trousers 306 captured in steps 606 and 612 to determine a distance that trousers 306 stretched along the dimension being monitored. This information can then be used to determine a compliance of trousers 306 in that same region, which may be represented as a ratio of force applied to trousers 306 in that region, to a distance that trousers 306 stretched in response to the application of that force.

The method of FIG. 7 may be performed by controller 316 in multiple parallel instances to determine a compliance of trousers 306 in multiple regions or along different dimensions. Different regions of trousers 306 may exhibit different compliance and so the various changes in the rates of change of expansion may occur at different times and with different air pressures of air bladder 302.

In an embodiment, for example, while filling air bladder 302, controller 316 may monitor the rates of changes in dimensions trousers 306 includes the waist, hips, upper thigh, thigh, knee, calf, and ankle dimensions. For each dimension being monitor, controller 316 may use the method of FIG. 7 to determine a compliance of trousers 306 in those regions.

In some embodiments, a fit test fixture may include two or more air bladders that are each configured to independently be inflated or expanded. The use of multiple air bladders within a fit test fixture may enable the fit test fixture to more accurately and precisely inhibit a clothing item. For example, individual air bladders could be assigned to particular regions of the clothing item for which dimensional or compliance data is to be captured. In some cases, the separate air bladders enable a fit test fixture to approximate multiple different body types by inflating or expanding different ones of the separate air bladders by a different amount.

Figure 8A:
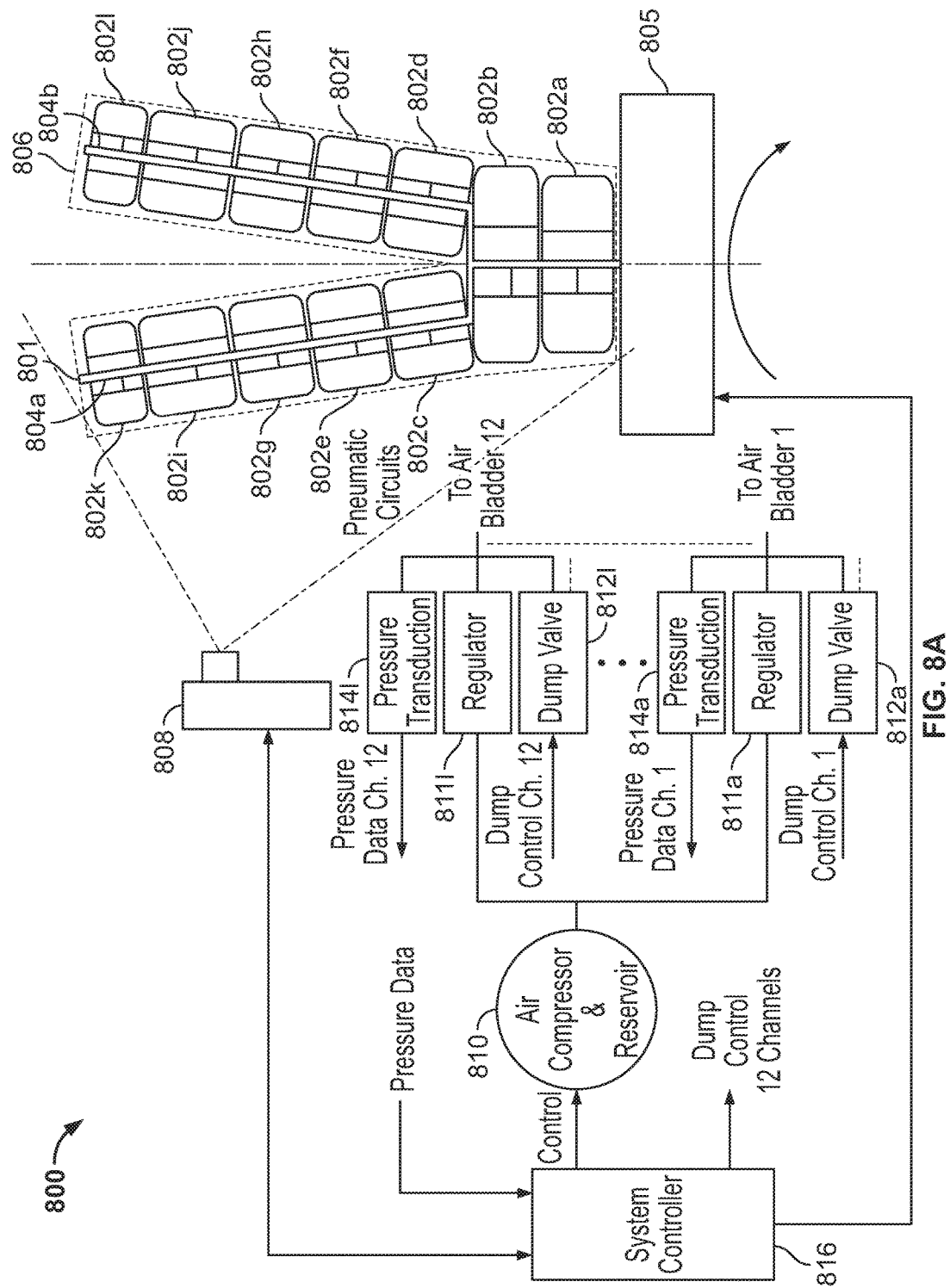
FIG. 8A depicts a second embodiment of a fit test fixture for measuring dimensions and compliance of a clothing item.

FIG. 8A, for example, depicts fit test fixture 800 including a number of different air bladders 802 (labeled individually 802a-802l). In the depicted example, fit test fixture 800 is configured to measure dimension and compliance attributes of a pair of trousers. It will be apparent, however, that the shape of fit test fixture 800 may be modified to generate similar measurements of other clothing items such as t-shirts, shirts, sweaters, shorts, and other items to be worn, such as socks, gloves, hats and the like.

Air bladders 802a-802l are mounted to support structure 801, which provides physical support to air bladders 802a-802l and, in some cases, may contain the pneumatic piping enabling air compressor to supply air to each of air bladders 802a-802l. The individual bladders of air bladders 802a-802l are not in fluid communication with one another, enabling each one of air bladders 802a-802l to be inflated by different amounts of air. When trousers 806 are installed onto fit test fixture 800, air bladders 802a-802l on each of projections 804a and 804b of support structure 801 are inserted into the legs of trousers 806 so as to occupy or inhabit the legs of trousers 806. A dashed line depicts the positioning of a pair of trousers 806 over fit test fixture 800.

Support structure 801 is mounted to turntable 805, which is configured to rotate air bladders 802a-802l about an axis running vertically up through support structure 801. The rotation of turntable 805 enables scanner 808 to capture a 360 degree view of trousers 806 positioned over air bladders 802a-802l as turntable 805 rotates.

Air compressor 810 is connected to air bladders 802a-802l through regulators 811a-811l, respectively. As such, each one of air bladders 802a-802l is connected to an independent one of regulators 811a-811l. In this arrangement, air compressor 810 is configured to pump air into air bladders 802a-802l through regulators 811a-811l. The independent regulators 811a-811l enable a precise control of air flow rate into each one of bladders 802a-802l and allow for independent control over the degree to which each of air bladders 802a-802l are inflated by air compressor 810. Dump valves 812a-812l are connected to air bladders 802a-802l, respectively, enabling air to be separately removed from each air bladders 802a-802l. Air pressure sensors 814a-814l are connected to air bladders 802a-802l to measure an air pressure of the volume defined by each air bladder 802a-802l.

Controller 816 is connected to each of air compressor 810, dump valves 812a-812l, air pressure sensors 814a-814l, regulators 811a-811l, and turntable 805 to either control the operation of or capture data from each of those components. Accordingly controller 816 can, after a pair of trousers 806 has been installed over fit test fixture 800, cause air compressor 810 and the associated regulators 811a-811l to pump air into each of air bladders 802a-802l. As air bladders 802a-802l inflates, controller 816 can initiate rotation of turntable 805 enabling scanner 808 to capture 360 degree views of trousers 806 as trousers 806 expand due to the inflating air bladders 802a-802l. Additionally, while air bladders 802a-802l inflates, controller 816 can capture measurement of the air pressures in each of air bladders 802a-802l over time from pressure sensors 814a-814l. As discussed below, the measurement of air pressure over time may facilitate the derivation of compliance data in different regions for trousers 806.

As depicted, scanner 808 is positioned to capture 3-D photographs or other imaging data of fit test fixture 800 and trousers 806 placed thereon. Scanner 808 may be configured, for example, to capture multiple photographic images and depth data of fit test fixture 800 and trousers 806 from a single location, while turntable 805 is rotated, enabling data capture from multiple, varying angles of trousers 806. With the visual data captured, 3-D modeling software may then be used to synthesize a 3-D model from the captured image data. That 3-D model of trousers 806 can then be inspected to determine particular size and compliance attributes of trousers 806. In still other embodiments, scanner 808 may include a combination of active and/or passive 3-D scanners that could be used to obtain the 3-D model directly from fit test fixture 800. In one specific embodiment, scanner 808 has a vertical field of vision of approximately 90 degrees and a horizontal field of vision of approximately 45 degrees. According to one embodiment, visual recognition logic may be employed by scanner 808 and/or controller 816 during the 3-D scanning process to obtain the dimension measurements and compliance data of trousers 806.

During testing, scanner 808 may be configured to continually capture data about trousers 806 on fit test fixture 800 and, using that data, continually update and generate a 3-D model of trousers 806. That substantially real-time 3-D model of trousers 806 can then be retrieved and processed by controller 816 as needed.

In a specific embodiment, with air bladders 802a-802l inflated and a 3-D model of trousers 806 captured by scanner 808, the 3-D model can be inspected by controller 816 to identify a number of specific dimensions of trousers 806. Referring back to FIG. 2, for example, the 3-D model can be used to determine waist, inseam, out seam, front rise, dip, hips, back rise, zipper, upper thigh, thigh, knee, calf, and ankle dimension measurements for trousers 806. Various techniques may be used to inspect the 3-D model of trousers 306 in order to determine dimension measurements thereof. In one embodiment, for example, a semantic machine learning engine may be trained to identify particular anchor points within the 3-D model of trousers 306. The anchor points represent known locations on trousers 306 and, once identified by the machine learning engine, can be used to determine the various dimension measurements of trousers 306. Once captured, that data can be stored, for example, in inventory database 112 of FIG. 1A and/or provided to clothing item rendering module 152 and fit heuristics engine 158 for processing as described above.

Additionally, by monitoring changes to the shape of trousers 806 over time via the corresponding 3-D model captured by scanner 808, compliance data for trousers 806 can be determined.

Figure 8B:
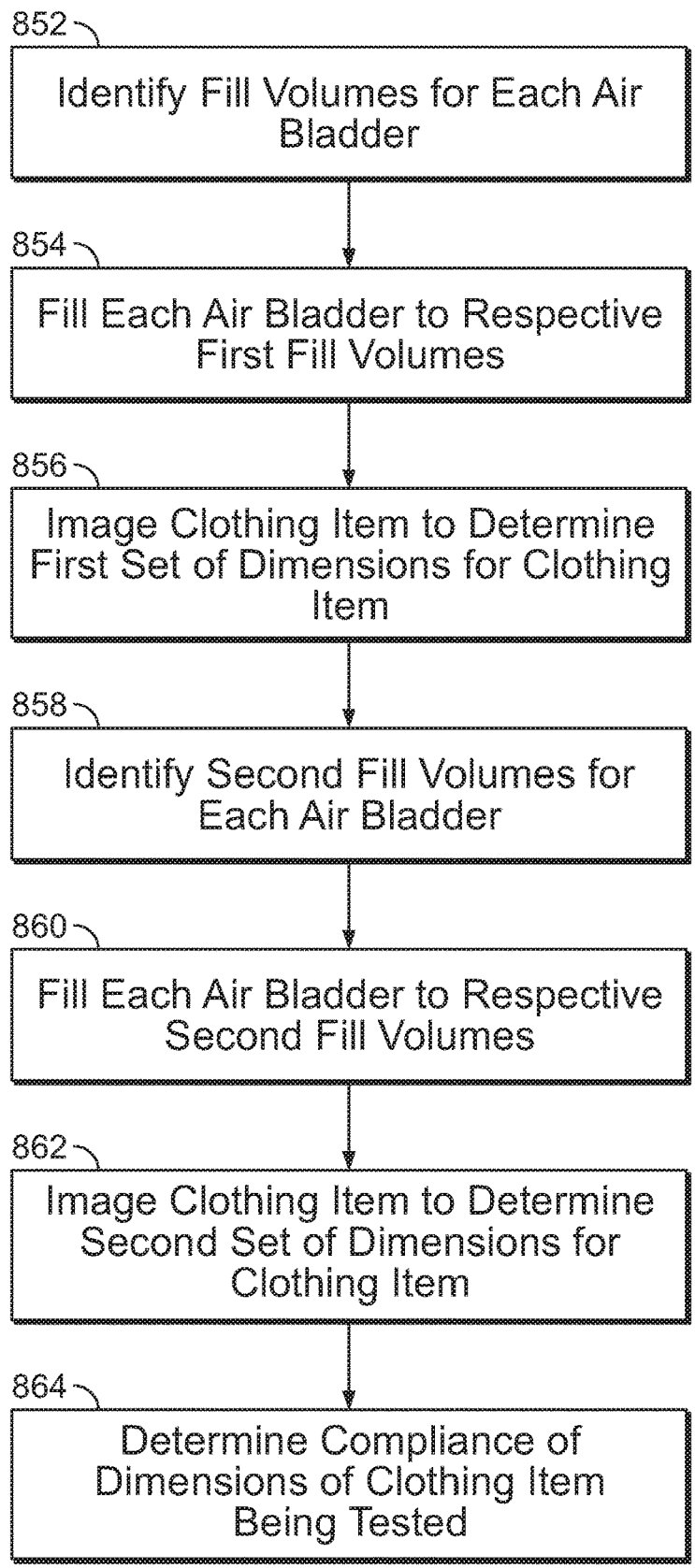
FIG. 8B is a flow chart depicting a method for a controller to determine compliance attributes of a clothing item positioned on a fit test fixture.

FIG. 8B is a flow chart depicting a method for controller 816 to determine compliance attributes of trousers 806 along a particular dimension. A pair of trousers 806 to be tested have been installed over fit test fixture 800.

In step 852, controller 816 identifies a first fill volume for each air bladders 802a-802l of fit test fixture 800. The first fill volume is a value controller 816 uses to determine amount of air to be pumped into air bladders 802a-802l to provide that trousers 806 are just-filed by the expanded air bladders 802a-802l. The first fill volume for each of air bladders 802a-802l may be stored, for example, in a look-up table contained within a memory of controller 816 or otherwise accessible to controller 816. The look-up table may specify, for example, for a particular type of clothing to be mounted to fit test fixture 800, a volume of air that should be pumped into each air bladder 802a-802l.

Additionally, because fit test fixture 800 includes a number of different air bladders 802a-802l, the look-up table may specify different fill volume to achieve a different body shape with the inflated air bladders 802a-802l. For example, a first set of fill volumes for air bladders 802a-802l may approximate the body shape of an individual with a 'pear' shaped body, while a second set of fill volumes for air bladders 802a-802l may approximate the body shape of an individual with a 'hour-glass' shaped body Table 2, below, shows an example look-up table that may be used by controller 816 to determine the first fill volume for air bladders 802a-802l given a particular body type and type of trousers 806. Table 2 specifies, for each of a number of different clothing item types (in this example, the table only includes fill volume values for different type of trousers) and body types, first fill volume values for each air bladder 802a-802l in fit test fixture 800. In this example, the first fill volume values are specified as pounds per square inch (psi) values.

TABLE 2

| Clothing Item Type | Body Type | Air Bladder # | First Fill Volume (psi) | Second Fill Volume (psi) |
|---|---|---|---|---|
| Jeans | Pear | 1 | Xxx psi | Yyy psi |
| Jeans | Pear | 2 | Xxx psi | Yyy psi |
| Jeans | Pear | 3 | Xxx psi | Yyy psi |
| Jeans | Pear | 4 | Xxx psi | Yyy psi |
| Jeans | Hourglass | 1 | Xxx psi | Yyy psi |
| Jeans | Hourglass | 2 | Xxx psi | Yyy psi |
| Jeans | Hourglass | 3 | Xxx psi | Yyy psi |
| Jeans | Hourglass | 4 | Xxx psi | Yyy psi |
| Dress Pants | Pear | 1 | Xxx psi | Yyy psi |
| Dress Pants | Pear | 2 | Xxx psi | Yyy psi |
| Dress Pants | Pear | 3 | Xxx psi | Yyy psi |
| Dress Pants | Pear | 4 | Xxx psi | Yyy psi |
| Dress Pants | Hourglass | 1 | Xxx psi | Yyy psi |
| Dress Pants | Hourglass | 2 | Xxx psi | Yyy psi |
| Dress Pants | Hourglass | 3 | Xxx psi | Yyy psi |
| Dress Pants | Hourglass | 4 | Xxx psi | Yyy psi |

In step 854 controller 816 inflates each air bladder 802a-802l to its corresponding first fill volume as determined in step 852. This may involve, for example, controller 816 activating air compressor 810 and modulating regulators 811a-811l to pump air into each air bladder 802a-802l until pressure sensors 814a-814l measures a particular psi value for each air bladder 802a-802l.

Once the first fill volume is achieved for each air bladder 802a-802l, in step 856 controller 816 retrieves a 3-D model of trousers 806, as currently filled by air bladders 802a-802l, from scanner 808. Controller 816 then determines an initial set of values for the dimensions of trousers 806 currently being inspected by controller 816. For example, controller 816 may determine the values of each of the dimensions depicted in FIG. 2C, which may ultimately be used to calculate compliance values for those dimensions, as described below.

With the first set of dimension values determined, in step 858 controller 816 identifies second fill volumes for air bladders 802a-802l. The second fill volumes are values that are selected to provide that the fabric of trousers 806 is stretched by the expanded air bladders 802a-802l. The second fill volumes may be stored, for example, in the same look-up table as the first fill volumes contained within a memory of controller 816 or otherwise accessible to controller 816. The second fill volumes may be specified as a volume of air that should be pumped into each air bladder 802a-802l to achieve the stretched state, or an air pressure of each air bladder 802a-802l that indicates the clothing item being tested is at the stretched state. For example, the fifth column of Table 2, above, specifies second fill volume values in psi.

In step 860 controller 816 inflates air bladders 802a-802l according to the second fill volumes determined in step 858. After the second fill volumes of air bladders 802a-802l are achieved, in step 862 controller 816 retrieves a second 3-D model of trousers 806, as currently filled by air bladders 802a-802l, from scanner'. Controller 816 then determines the values of the dimension of trousers 806 currently being inspected by controller 816.

In step 864, controller 816 analyzes the dimension measurements of trousers 806 captured in steps 856 and 862 to determine a distance that trousers 806 stretched along the dimensions being monitored. This information can then be used to determine a compliance of trousers 806 over those dimensions.

In some cases, a rigid or at least semi-rigid covering may be positioned over or around a portion of the one or more air bladders of the present fit test fixture. Without such a covering, the air bladders are generally expandable in all directions. The covering may be employed to, at least partially, constrain the expansion of the fit test fixture's one or more air bladders in a particular direction or into a particular shape. Additionally, the covering can enable the inflatable one or more air bladders to more accurately mimic the shape and texture of a human body, where the rigid or semi-rigid covering can approximate more rigid areas of the human body such as elbows, knees, shins, and the like.

The external covering may take the form of a number of individual or segmented plates that are each individually affixed, coupled, or removably coupled to a portion of an air bladder of the fit test fixture. As the air bladder expands, the one or more plates of the external covering will generally move away from one another and, as the air bladder continues to expand, will eventually contact a portion of the clothing item being tested on the fit test fixture. The plates may include a rigid or semi-rigid material such as a plastic, metal, wood, or the like. The plate are each curvilinear and may be attached to an air bladder at a single attachment point. A particular fit test fixture can include any number of inflatable air bladders, where each individual air bladder may have any number of attached plates.

Figure 9A:
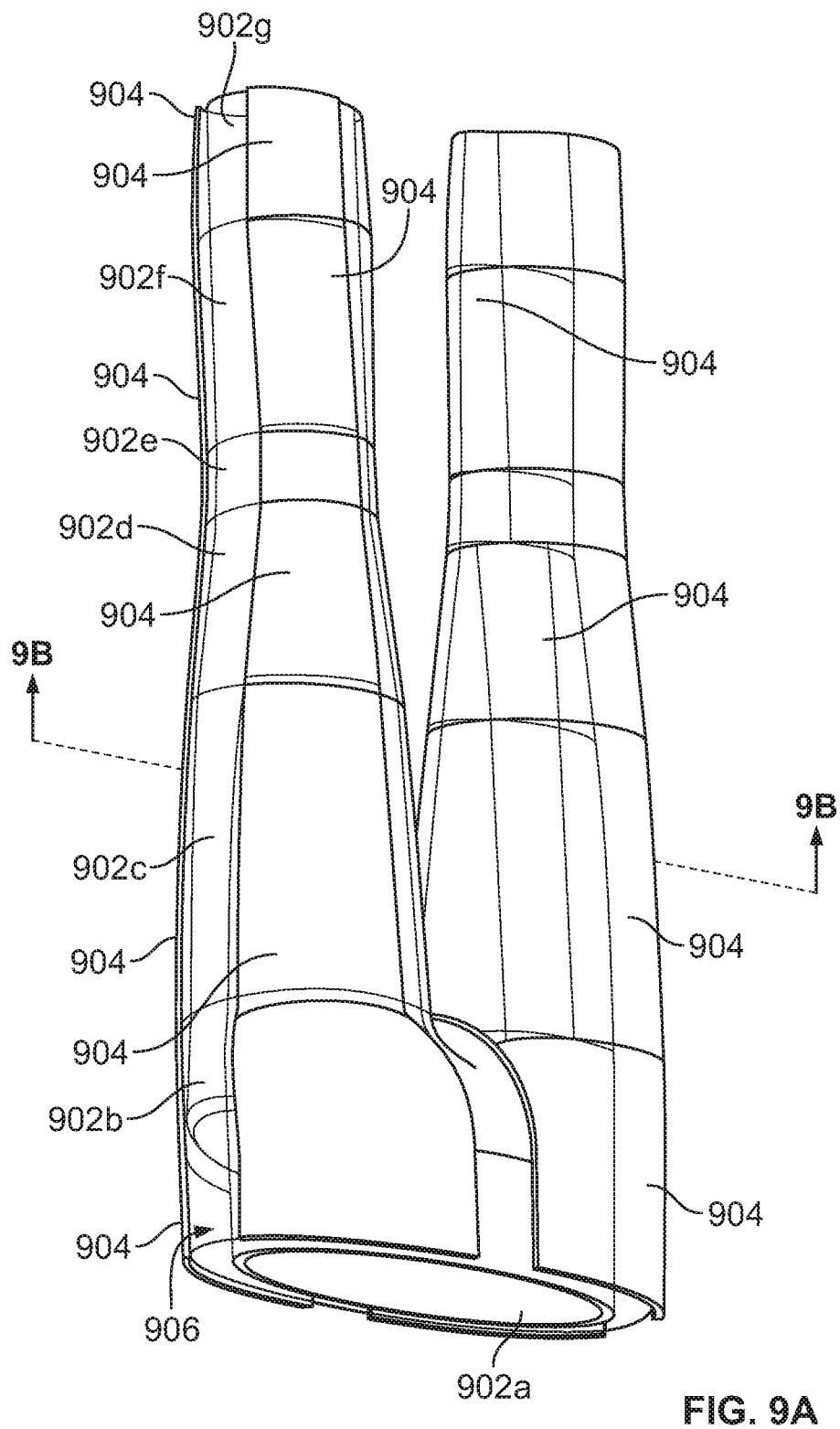
FIG. 9A depicts an air bladder of a fit test fixture in which the air bladder is surrounded by a semi-rigid segmented outer skin.
Figure 9B:
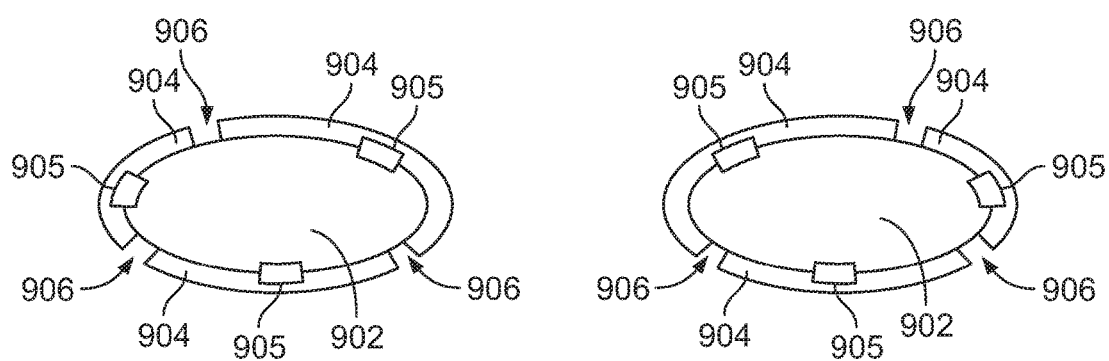
FIG. 9B is a cross-sectional view of the air bladder arrangement of FIG. 9A taken along line 9B-9B.

To illustrate, FIG. 9A depicts an air bladder 902 of a fit test fixture including an outer covering that covers at least a portion of air bladder 902. FIG. 9B is a cross-section view of air bladder 902 taken along line 9B-9B of FIG. 9A. In the depicted example, air bladder 902 generally corresponds to the shape of the lower half of a human body and includes individual air bladders 902a-902g, though in other embodiments, any number of air bladders 902 having any shape may be utilized. A covering is formed over at least a portion of air bladders 902 that includes external plates 904. As depicted, plates 904 form the general shape of the lower half of a human body. Plates 904 can be contoured, for example, to provide the form of the legs of the human body as well as including knee cap shapes and defining other relatively hard surfaces of the human body. Plates 904 are mounted to air bladders 902. Gaps 906 formed between plates 904 allow air bladders 902 to expand when inflated by enabling plates 904 to move away from one another.

Plates 904 may be mounted to air bladders 902 using any suitable fastening mechanism 905 (see FIG. 9B). For example, plates 904 may be mounted to air bladders 902 using an adhesive material or other attached mechanism. In other embodiments, two-part fasteners may be utilized in which a first part of the fastener is either attached to or molded into an outer surface of air bladders 902. The second part of the two-part fasteners can then be either attached to or molded into an inner surface of plates 904. The two-part fasteners could then be used to attach plates 904 to air bladders 902. Example two-part fasteners may include, for example, snaps, hook-and-loop fasteners, clasps, buttons, and the like. In some embodiments, one or more of the fasteners on air bladders 902 and plates 904 may be configured to allow movement of plates 904 with respect to air bladders 902 while air bladders 902 are inflated. For example, air bladders 902 may be configured with button-style fasteners that engage a track or recess formed within plates 904. In that case, as air bladders 902 expand, the buttons of air bladders 902 can move within the tracks of plates 904. In still other embodiments, plates 904 are not fixed to air bladders 902. In that case, the clothing item positioned over air bladders 902 may provide sufficient constraint to hold plates 904 in place during inflation of air bladders 902.

Figure 10:
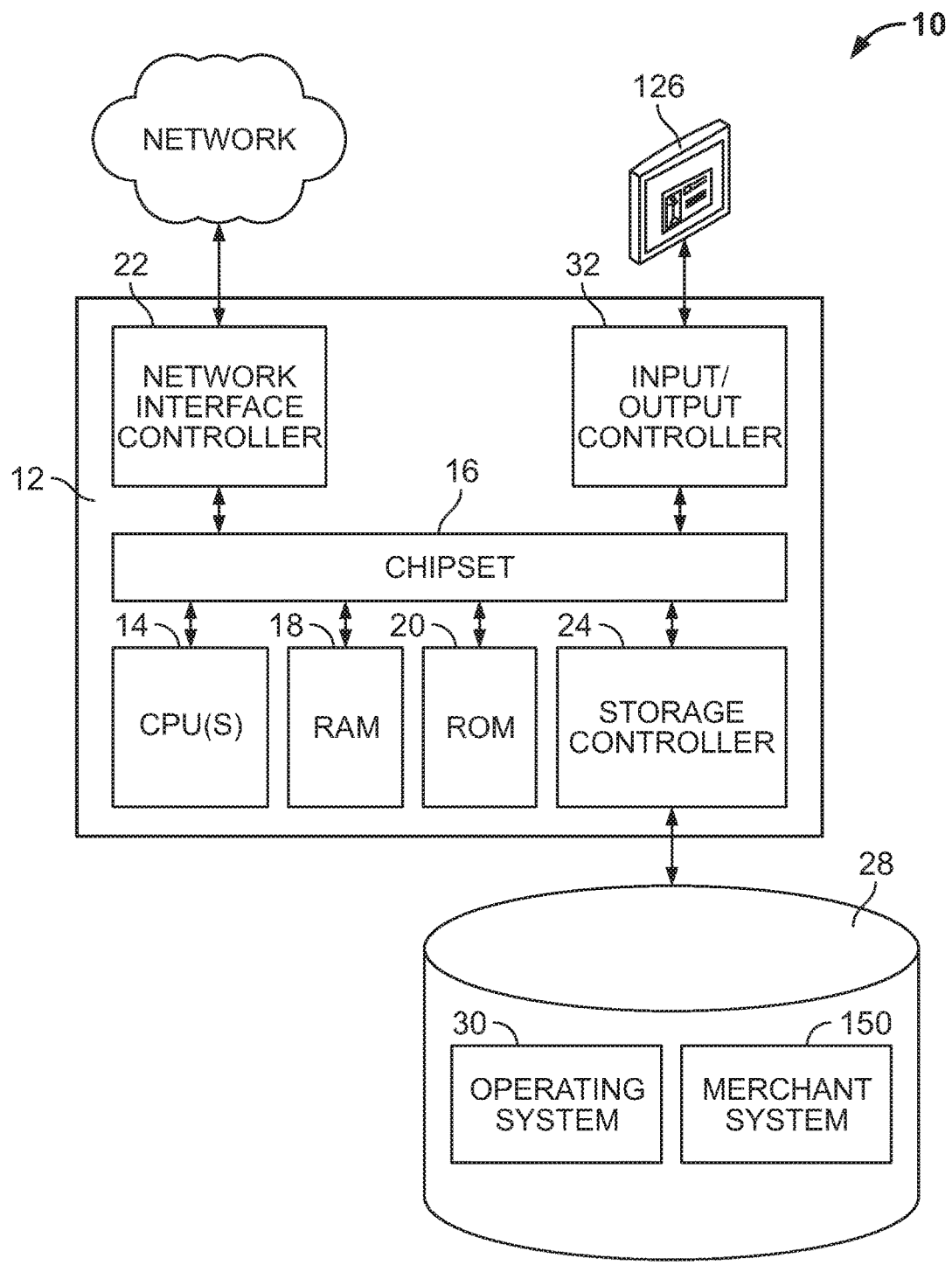
FIG. 10 shows an example computer architecture for a computer capable of executing the software components described herein for providing visualization of fit of clothing items to an online consumer.

FIG. 10 shows an example computer architecture 10 for a computer 12 capable of executing the software components described herein for providing visualization of fit of clothing items to an online consumer, in the manner presented above. The computer architecture 10 shown in FIG. 10 illustrates a conventional server computer, workstation, desktop computer, laptop, network appliance, PDA, electronic book reader, digital cellular phone, or other computing device, and may be utilized to execute any aspects of the software components presented herein described as executing on merchant system 150, computing device 126, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that help to startup the computer 12 and to transfer information between the various components and devices. The ROM 20 or NVRAM may also store other software components necessary for the operation of the computer 12 in accordance with the embodiments described herein.

The chipset 16 further includes functionality for providing network connectivity through a network interface controller ("NIC") 22, such as an Ethernet adapter. The NIC 22 is capable of connecting the computer 12 to other computing devices over a network. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, and the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable storage media to store and retrieve information, such as program modules, data structures, or other data. It should be appreciated by those skilled in the art that computer-readable storage media can be any available, non-transitory media that may be accessed by the computer 12. Computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other non-transitory medium that can be used to store the desired information.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as those implementing merchant system 150 described above in regard to FIG. 1A. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above.

The computer 12 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display device, such as a computer monitor, a flat-panel display, a digital projector, a printer, a plotter, or other type of output device. It will be appreciated that the computer 12 may not include all of the depicted components, may include other components that are not explicitly depicted, or may utilize an architecture completely different than that depicted.

In an embodiment, a system includes a fit test fixture including a support structure, and an air bladder connected to the support structure. The air bladder includes first and second projections. The first projection is configured to be positioned in a first volume defined by a clothing item. The second projection is configured to be positioned in a second volume defined by the clothing item. The system includes a scanner configured to capture photographic images of the clothing item positioned over at least a portion of the fit test fixture, and process the photographic images of the clothing item into a three-dimensional model of the clothing item. The system includes an air compressor in fluid communication with the air bladder, and a controller. The controller is configured to cause the air compressor to inflate the air bladder, determine that the clothing item is fully inhabited by the air bladder, retrieve the three-dimensional model from the scanner, the three-dimensional model depicting the clothing item as fully inhabited by the air bladder, and store the three-dimensional model in a database.

In another embodiment, a system includes a fit test fixture including a support structure, a first air bladder connected to the support structure, and a second air bladder connected to the support structure. The system includes a scanner configured to generate a three-dimensional model of a clothing item positioned over at least a portion of the fit test fixture, and a controller. The controller is configured to cause an air compressor to inflate the first air bladder and the second air bladder, and store the three-dimensional model of the clothing item in a database. The three-dimensional model depicts the clothing item at least partially inhabited by the first air bladder and the second air bladder.

In another embodiment, a system includes an inventory database configured to store a three-dimensional model of a clothing item and data describing the clothing item. The data identifies a dimension of the clothing item and a compliance of the clothing item along the dimension of the clothing item. The system includes a consumer database configured to store a three-dimensional model of a consumer, and a computing device including a processor. The processor is configured to retrieve the three-dimensional model of the consumer from the consumer database, retrieve the three-dimensional model of the clothing item from the inventory database, modify the three-dimensional model of the clothing using the compliance of the clothing item along the dimension to generate a modified three-dimensional model of the clothing item, generate a rendering depicting the modified three-dimensional model of the clothing item on the three-dimensional model of the consumer, and transmit the rendering to a computing device of the consumer.

Based on the foregoing, it should be appreciated that technologies for measuring and determining attributes of clothing items and the generation of visualizations of those clothing item are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising:
    a fit test fixture including:
        a support structure, and
        an air bladder connected to the support structure, the air bladder including first and second projections, the first projection being configured to be positioned in a first volume defined by a clothing item, and the second projection being configured to be positioned in a second volume defined by the clothing item;
    a scanner configured to:
        capture photographic images of the clothing item positioned over at least a portion of the fit test fixture, and
        process the photographic images of the clothing item into a three-dimensional model of the clothing item;
    an air compressor in fluid communication with the air bladder; and
    a controller, the controller being configured to:
        cause the air compressor to inflate the air bladder,
        determine that the clothing item is fully inhabited by the air bladder,
        retrieve the three-dimensional model from the scanner, the three-dimensional model depicting the clothing item as fully inhabited by the air bladder, and
        store the three-dimensional model in a database.

2. The system of claim 1, further comprising a second air bladder connected to the support structure, the second air bladder not being in fluid communication with the air bladder, the second air bladder being in fluid communication with the air compressor and wherein the controller is configured to cause the air compressor to inflate the second air bladder.

3. The system of claim 1, wherein the controller is configured to determine that the clothing item is fully inhabited by the air bladder by:
    identifying a first fill volume for the air bladder; and
    causing the air compressor to supply an amount of air to the air bladder, wherein the amount of air is determined by the first fill volume.

4. The system of claim 1, wherein the controller is configured to determine that the clothing item is fully inhabited by the air bladder by:
    monitoring, while the air bladder inflates, a rate of change of a dimension of the three-dimensional model generated by the scanner; and
    determining that the clothing item is fully inhabited by the air bladder upon detecting a change in the rate of change of the dimension of the three-dimensional model.

5. A system, comprising:
    a fit test fixture including a support structure;
    a first air bladder connected to the support structure;
    a second air bladder connected to the support structure;
    a scanner configured to generate a three-dimensional model of a clothing item positioned over at least a portion of the fit test fixture; and
    a controller, the controller being configured to:
        cause an air compressor to inflate the first air bladder and the second air bladder, and
        store the three-dimensional model of the clothing item in a database, wherein the three-dimensional model depicts the clothing item at least partially inhabited by the first air bladder and the second air bladder.

6. The system of claim 5, wherein the first air bladder includes first and second projections, the first projection being configured to be positioned in a first volume defined by the clothing item, and the second projection being configured to be positioned in a second volume defined by the clothing item.

7. The system of claim 5, wherein at least one of the first air bladder and the second air bladder includes at least one of rubber, polyurethane, and latex.

8. The system of claim 5, further comprising a plate attached to a surface of the first air bladder.

9. The system of claim 8, wherein the first air bladder includes a first fastener attached to an outer surface of the first air bladder and the plate includes a second fastener attached to a surface of the plate and the first fastener is configured to removably couple to the second fastener.

10. The system of claim 5, wherein the controller is configured to identify a first fill volume for the first air bladder and a second fill volume for the second air bladder and wherein causing the air compressor to inflate the first air bladder includes causing the air compressor to supply a first amount of air to the first air bladder, wherein the first amount of air is determined by the first fill volume and causing the air compressor to inflate the second air bladder includes causing the air compressor to supply a second amount of air to the second air bladder, wherein the second amount of air is determined by the second fill volume.

11. The system of claim 5, wherein the controller is configured to:
   monitor a rate of change of a dimension of the three-dimensional model generated by the scanner; and
   determine that the clothing item is inhabited by the first air bladder and the second air bladder upon detecting a change in the rate of change of the dimension of the three-dimensional model.

12. The system of claim 5, wherein the controller is configured to:
   determine a first measurement of a dimension of the three-dimensional model at a first level of inflation of the first air bladder and a second level of inflation of the second air bladder;
   determine a second measurement of the dimension of the three-dimensional model at a third level of inflation of the first air bladder and a fourth level of inflation of the second air bladder; and
   determine a compliance of the clothing item by comparing the first measurement of the dimension to the second measurement of the dimension.

13. The system of claim 5, wherein the controller is configured to:
   determine a first fill volume for the first air bladder;
   cause the air compressor to fill the first air bladder to the first fill volume;
   determine a first measurement of a dimension of the three-dimensional model when the first air bladder is at the first fill volume;
   determine a second fill volume for the first air bladder;
   cause the air compressor to fill the first air bladder to the second fill volume;
   determine a second measurement of the dimension of the three-dimensional model when the first air bladder is at the second fill volume; and
   determine a compliance of the clothing item by comparing the first measurement of the dimension to the second measurement of the dimension.

14. The system of claim 5, wherein the scanner is configured to capture an optical image depicting a surface ornamentation of the clothing item and the three-dimensional model of the clothing item includes at least a portion of the optical image arranged upon a surface of the three-dimensional model.

15. The system of claim 5, further comprising a turntable coupled to the fit test fixture and wherein the controller is configured to cause the turntable to rotate about an axis running through the fit test fixture.

16. A system, comprising:
   a scanner configured to generate a model of a clothing item positioned over a first portion of a fit test fixture; and
   a controller, the controller being configured to:
      modify a shape of the first portion of the fit test fixture, and
      store the model of the clothing item in a database, wherein the model depicts the clothing item at least partially inhabited by the first portion.

17. The system of claim 16, wherein the first portion of the fit test fixture includes an air bladder and the controller is configured to cause an air compressor to inflate the air bladder.

18. The system of claim 17, wherein the controller is configured to:
   monitor, while the air bladder inflates, a rate of change of a dimension of the model; and
   determine that the clothing item is inhabited by the air bladder upon detecting a change in the rate of change of the dimension of the model.

19. The system of claim 17, wherein the controller is configured to:
   determine a first measurement of a dimension of the model at a first level of inflation of the air bladder;
   determine a second measurement of the dimension at a second level of inflation of the air bladder; and
   determine a compliance of the clothing item by comparing the first measurement to the second measurement.

20. The system of claim 16, wherein the scanner is configured to capture an optical image depicting a surface ornamentation of the clothing item and the model of the clothing item includes at least a portion of the optical image arranged upon a surface of the model.

* * * * *